United States Patent [19]
Funada et al.

[11] Patent Number: 6,041,205
[45] Date of Patent: *Mar. 21, 2000

[54] IMAGE PROCESSING APPARATUS FOR LAYING OUT PLURALITY OF IMAGES IN CONFORMITY WITH IMAGE ORIENTATION

[75] Inventors: Masahiro Funada; Yukari Toda, both of Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,274

[22] Filed: Jun. 24, 1997

[30] Foreign Application Priority Data

Jun. 25, 1996 [JP] Japan ..................................... 8-164632
Jun. 28, 1996 [JP] Japan ..................................... 8-169912

[51] Int. Cl.$^7$ ................................................ G03G 21/00
[52] U.S. Cl. ......................... 399/196; 399/179; 399/370; 399/371; 399/376; 382/286
[58] Field of Search ..................................... 399/197, 196, 399/179, 178, 370, 371, 372, 376; 382/112, 286, 290

[56] References Cited

U.S. PATENT DOCUMENTS

| | | | |
|---|---|---|---|
| 5,010,371 | 4/1991 | Matsuo et al. | 355/313 |
| 5,028,042 | 7/1991 | Yamada et al. | 271/9 |
| 5,220,395 | 6/1993 | Yamashita et al. | 355/313 |
| 5,383,754 | 1/1995 | Sumida et al. | 412/11 |
| 5,815,786 | 9/1998 | Isemura | 399/376 |

FOREIGN PATENT DOCUMENTS 60-67969  4/1985  Japan ................................. 355/327 A

*Primary Examiner*—Richard Moses
*Attorney, Agent, or Firm*—Fitzpatrick, Cella, Harper & Scinto

[57] ABSTRACT

A copier includes a reader for reading a document image, an orientation sensor for sensing orientation of characters in the document image that has entered from the reader, a size sensor for sensing the size of the document image that has entered from the reader, an image processor for zooming the document image at a magnification that conforms to results of sensing performed by the orientation sensor and size sensor, and laying out a plurality of document images as a single image, and a printer for printing the images laid out by the image processor.

48 Claims, 28 Drawing Sheets

Filing Fair '94

Sponsored by ○○○○

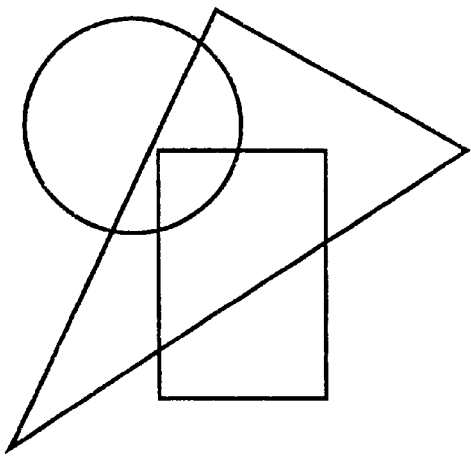

Electronic filing
Optical Character
Recognition

IN MODERN SOCIETY THAT IS INUNDATED WITH INFORMATION, THERE IS RAPIDLY GROWING DEMAND FOR DIGITIZATION OF INFORMATION TO FACILITATE INFORMATION MANAGEMENT AND RETRIEVAL. OPTICAL CHARACTER RECOGNITION (OCR), WHICH CONVERTS THE IMAGE OF A CHARACTER READ BY AN INPUT UNIT SUCH AS A SCANNER TO A CHARACTER CODE, IS VITAL FOR THE DIGITIZATION OF INFORMATION, AND THE ACCURACY OF OCR IS EVER INCREASING. OWING TO DIFFERENCES IN THE CHARACTERISTICS OF THE JAPANESE LANGUAGE (KANJI, HIRAGANA AND KATAKANA CHARACTERS), THE ENGLISH LANGUAGE (ALPHABETIC CHARACTERS) AND OTHER LANGUAGES, IT IS DIFFICULT FOR JAPANESE-LANGUAGE OCR TO RECOGNIZE ALPHABETIC CHARACTERS (ESPECIALLY LOWER-CASE ALPHABETIC CHARACTERS). DIFFERENT RECOGNITION ALGORITHMS ARE USED FOR THIS REASON. EVEN IF THE SAME ALGORITHM IS USED, DICTIONARIES ARE SWITCHED BETWEEN DEPENDING UPON THE LANGUAGE.

801 CCD
802 INPUT IMAGE MEMORY 1
803 INPUT IMAGE MEMORY 2
804 INPUT IMAGE MEMORY 3
805 ORIENTATION DISCRIMINATION
806 LAYOUT SELECTION
807 REDUCTION PROCESSING
808 OUTPUT IMAGE MEMORY WRITE
809 OUTPUT IMAGE MEMORY READ
810 BINARIZATION PROCESSING
811 CHATACTER EXTRACTION PROCESSING
812 OCR PROCESSING
813 RESULTS

IMAGE PROCESSING APPARATUS FOR LAYING OUT PLURALITY OF IMAGES IN CONFORMITY WITH IMAGE ORIENTATION

BACKGROUND OF THE INVENTION

1. Field of the Invention

This invention relates to an image processing apparatus for laying out (i.e. arranging) a plurality of images in conformity with the orientations of the images.

2. Description of the Related Art

Increasingly intelligent copiers have been developed in recent years and possess a variety of functions such as the ability to lay out a plurality of original documents in the form of a single sheet and produce double-sided copies. The automation and operating speed of such copiers have been forwarded by the perfection of automatic document feeders (such a feeder is referred to also as an "ADF").

In order to make efficient use of a copier having these advanced functions, it is important that the orientations of originals be discriminated in the copier. For example, in an apparatus currently available, use is made of a so-called "4-in-1" images processing function employing an ADF to lay out four originals and print out one sheet on each of which four of the originals have been copied, as shown in FIG. 28. In a copier of this type, prior to copying the user must arrange all of the originals right-side up or originals must be rearranged upon taking into account portrait-format originals, landscape-format originals, vertical writing and horizontal writing. This requires considerable labor.

SUMMARY OF THE INVENTION

An object of the present invention is to provide an image processing apparatus which solves the aforementioned problem.

Another object of the present invention is to provide an image processing apparatus capable of laying out a plurality of images in conformity with image orientation.

According to the present invention, the foregoing objects are attained by providing an image processing apparatus comprising input means for entering a document image, first sensing means for sensing orientation of the document image that has been entered by the input means, second sensing means for sensing size of the document image that has been entered by the input means, and image processing means for zooming the document image, which has been entered by the input means, at a magnification that conforms to results of sensing performed by the first and second sensing means, and laying out a plurality of document images as a single image.

In another aspect of the present invention, the foregoing objects are attained by providing an image processing apparatus comprising input means for entering a document image, sensing means for sensing orientation of the document image that has been entered by the input means, and image processing means for laying out a plurality of document images as one image in dependence upon results of sensing performed by the sensing means; wherein in response to presence of a document image whose orientation cannot be sensed by the sensing means, the image processing means lays out this document image upon assuming that the orientation thereof is the same as the orientations of other document images laid out together with this document image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a diagram for describing character detection processing;

DESCRIPTION OF THE PREFERRED EMBODIMENTS

An image processing apparatus according to a first preferred embodiment of the invention will be described in detail with reference to the drawings. An example in which the present invention is applied to a full-color copier of the type that uses a laser beam to form C, M, Y and K images on respective ones of four photosensitive drums will be described as the preferred embodiment. However, the present invention is applicable also to a full-color copier of the type that forms images in the C, M, Y, K order using a single photosensitive drum, a copier of the type that forms a color image using the three colors C, M and Y, a two-color copier and a black-and-white copier as well as color and black-and-white copiers which print using the ink-jet method or thermal-head method.

[Overview of apparatus]

Figure 1:
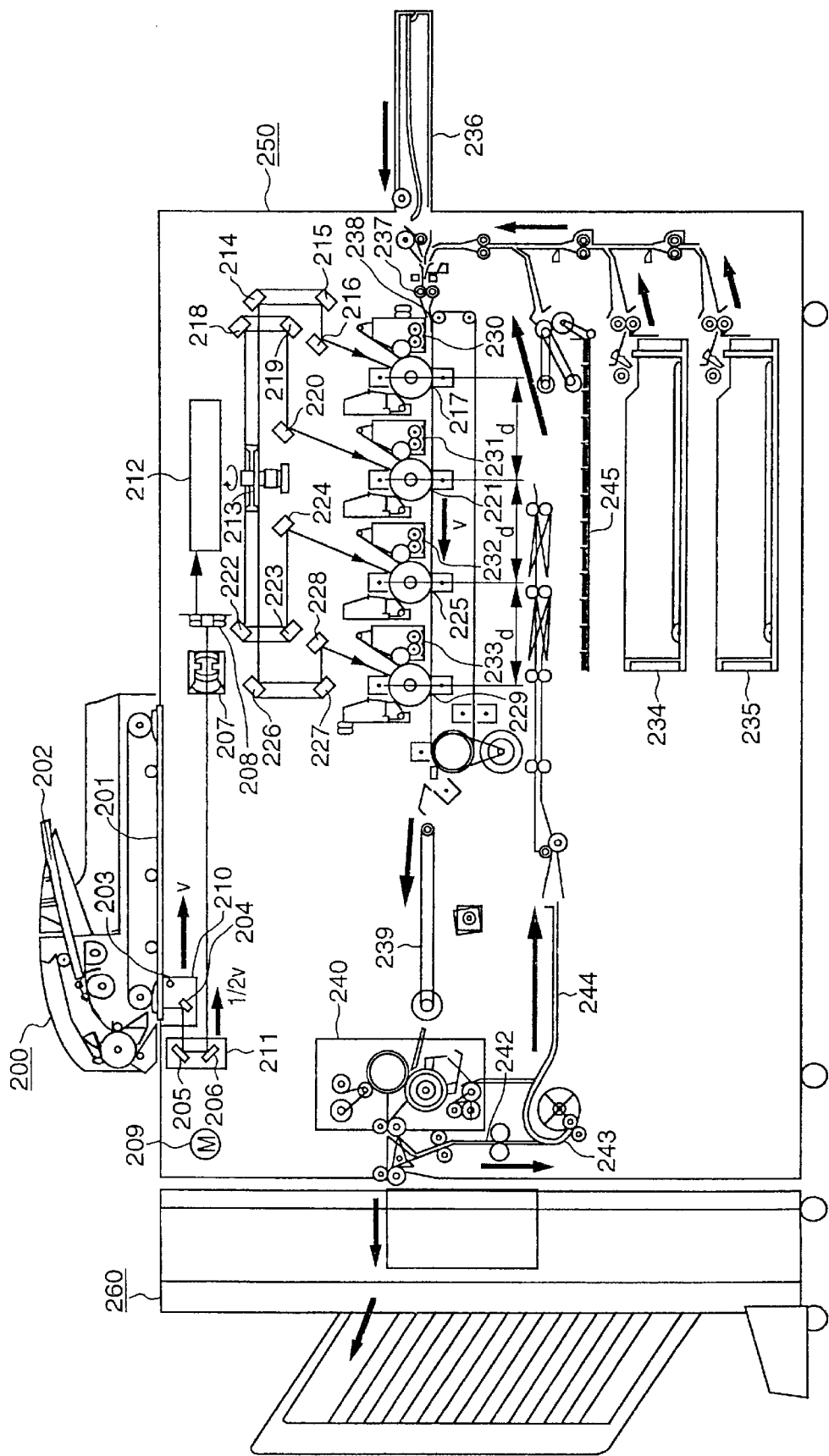
FIG. 1 is a schematic view illustrating a color copier according to an embodiment of the present invention.

FIG. 1 is a schematic view illustrating a color copier according to an embodiment of the present invention.

A color copier 250 illustrated in FIG. 1 is equipped with optional equipment, namely an ADF 200 for supplying a platen 201 of the copier 250 with original documents taken automatically one at a time from a plurality of documents 202, and a sorter/stapler 260 for sorting and stapling sheets of recording paper discharged from the copier 250. It should be noted that the ADF 200 is capable of setting the front and back sides of each document on the platen 201 in successive fashion. Since the specific constructions of the ADF 200 and sorter/stapler 260 are well known, these need not be described in detail.

A document that has been supplied to the platen 202 from the plurality of documents stacked in the ADF 200 is illuminated with light from an illuminating lamp 203. Light reflected from the document is introduced to mirrors 204, 205, 206 and arrives at a CCD 208 via an optical system 207, whereby an image is formed on the CCD 208. A mirror unit 210, which includes the mirror 204 and the illuminating lamp 203, is moved mechanically by a motor 209 at a velocity V in a direction (the auxiliary scanning direction) which perpendicularly intersects the array of elements of the CCD 208. A mirror unit 211, which includes the mirrors 205, 206, is moved by the motor 209 at a velocity V/2 in the auxiliary scanning direction, whereby the full surface of the document is scanned.

An image processing circuit 212, the details of which will be described later, processes read image data electrically, stores the processed information in an image memory temporarily and then outputs the information as a print signal. The print signal output by the image processing circuit 212 is sent to a laser driver (not shown), which drives four semiconductor laser elements, not shown. Four laser beams output by the four semiconductor laser elements are each reflected by a polygon mirror 213, with one of the four laser beams being made to scan a photosensitive drum 217 via mirrors 214, 215 and 216. Similarly, a second one of the laser beams is made to scan a photosensitive drum 221 via mirrors 218, 219 and 220, a third laser beam is made to scan a photosensitive drum 225 via mirrors 222, 223 and 224, and a fourth laser beam is made to scan a photosensitive drum 229 via mirrors 226, 227 and 228.

A latent image that has been formed on the photosensitive drum 217 is developed into a toner image by a yellow (Y) toner supplied by a developing unit 230. Similarly, a latent image that has been formed on the photosensitive drum 221 is developed into a toner image by a magenta (M) toner supplied by a developing unit 231, a latent image that has been formed on the photosensitive drum 225 is developed into a toner image by a cyan (C) toner supplied by a developing unit 232, and a latent image that has been formed on the photosensitive drum 229 is developed into a toner image by a black (B) toner supplied by a developing unit 233.

Meanwhile, recording paper supplied to an image forming section from a recording paper cassette 234 or 235 or from a manual insertion tray 236 is attracted to a transfer belt 238 via registration roller 237 and is conveyed by the belt at the velocity V. In synchronization with the paper supply and conveyance timing, the toner images of the respective colors are formed on the photosensitive drums 217, 221, 225, 229 and the images are transferred to the recording paper conveyed to each drum. The recording paper to which the toner images of each of the above-mentioned colors have been transferred is separated from the transfer belt 238 and is then conveyed to a fixing unit 240 by a conveyance belt 239. The toner images are fixed to the recording paper by the fixing unit 240, after which the recording paper is delivered to the sorter/stapler 260 in case of single-sided copying or sent to a double-side copy path 242 in case of double-sided copying.

In case of double-sided copying, the recording paper that has been sent to the path 242 is turned over by a reversing path 243 and is delivered via a conveyance path 244 to a double-sided copy tray 245, where the paper is retained. The recording paper retained in the tray 245 is again supplied to the image forming section where, through a procedure the same as that set forth above, an image is formed on the back side of the recording. After the image is formed, the recording paper is delivered to the sorter/stapler 260.

[Flow of image signal]

Figure 2:
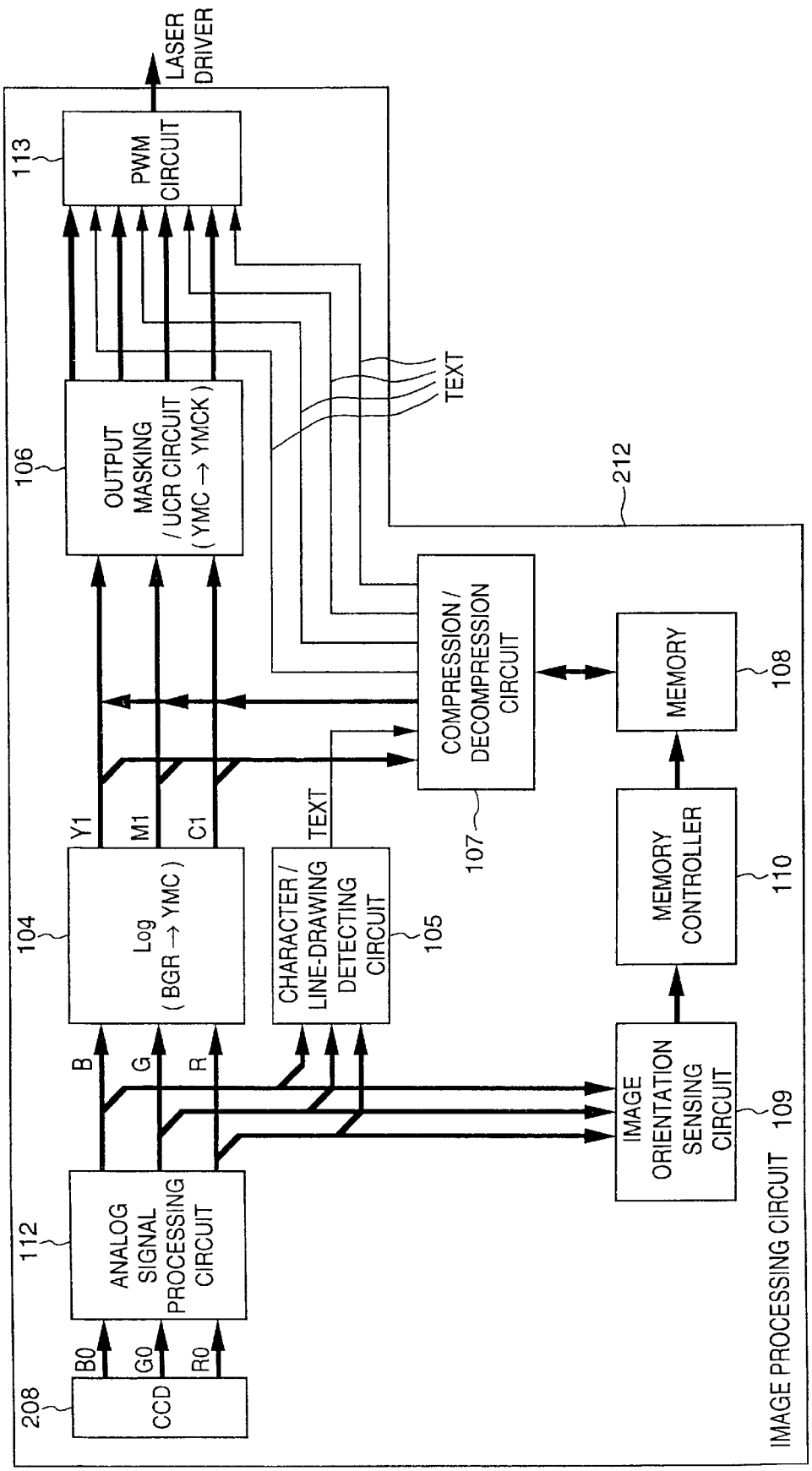
FIG. 2 is a block diagram illustrating an example of the construction of an image processing circuit shown in FIG. 1.

FIG. 2 is a block diagram illustrating an example of the image processing circuit 212.

An RGB image signal output by the CCD 208 is subjected to an A/D conversion for each of its color components by an analog signal processing circuit 112, after which the resulting signal is subjected to input masking processing in accordance with Equation (1) below to obtain an image signal in standard RGB color space (e.g., NTSC-RGB color space). Coefficients cij (i=1, 2, 3; j=1, 2, 3) in Equation (1) are coefficients specific to the apparatus and take into account such characteristics as the sensitivity characteristic of the CCD 208 and the spectrum characteristic of the illuminating lamp 203.

$$\begin{bmatrix} R \\ G \\ B \end{bmatrix} = \begin{bmatrix} c11 & c12 & c13 \\ c21 & c22 & c23 \\ c31 & c32 & c33 \end{bmatrix} \begin{bmatrix} R0 \\ G0 \\ B0 \end{bmatrix} \quad (1)$$

A luminance/density converting circuit 104, which is a look-up table constituted by a RAM or ROM, converts the RGB luminance signal, which has been output by the analog signal processing circuit 112, to a CMY density signal in accordance with the following equations:

$$C1 = -K \cdot \log(R/255)$$
$$M1 = -K \cdot \log(G/255) \quad (2)$$
$$Y1 = -K \cdot \log(B/255)$$

where the base of the logarithm is 10 and K is a constant.

An output masking/UCR circuit 106 converts M1, C1, Y1 signals output by the luminance/density converting circuit 104 to Y, M, C, K signals, which represent the toner colors of the image forming section, in accordance with the Equations (3) and (4) below. Coefficients aij (i=1, 2, 3, 4; j=1, 2, 3, 4) in Equation (3) are coefficients specific to the apparatus and take into account the tone characteristics of the toners.

$$\begin{bmatrix} C \\ M \\ Y \\ K \end{bmatrix} = \begin{bmatrix} a11 & a21 & a31 & a41 \\ a12 & a22 & a32 & a42 \\ a12 & a23 & a33 & a43 \\ a14 & a24 & a34 & a44 \end{bmatrix} \begin{bmatrix} C1 \\ M1 \\ Y1 \\ K1 \end{bmatrix} \quad (3)$$

On the basis of the RGB signal that has entered from the analog signal processing circuit 112, a character/line-drawing detecting circuit 105 determines whether each pixel in the image of a document is part of a character or line drawing and outputs the result as a discriminating signal TEXT. A compression/decompression circuit 107 compresses the RGB image signal and the discriminating signal TEXT to reduce the quantity of information and then outputs the compressed signals to a memory 108. Further, the compression/decompression circuit 107 decompresses compressed data, which has been read out of the memory 108, to the RGB image signal and discrimination signal TEXT.

There is no particular limitation upon the compression/decompression algorithm used in the compression/decompression circuit 107. For example, block coding using an orthogonal transformation, such as specified by the so-called JPEG (Joint Photographic Experts Group) or DPCM (Differential Pulse Code Modulation) coding using differential values for every pixel can be employed. Further, in this embodiment, an example in which compression/decompression of image data is executed by hardware is illustrated. However, data compression/decompression may be implemented by software as well.

On the basis of the RGB signal that has entered from the analog signal processing circuit 112, an image orientation sensing circuit 109 senses the orientation of a read image (i.e. whether the image of a document is oriented vertically or horizontally) and the typesetting direction (vertical or horizontal writing) of the read image, and outputs the results.

A memory controller 110 controls the read/write operation of the memory 108. In a case where a 2-in-1 or 4-in-1 image-reduction layout has been set by a control panel (not shown), the memory controller 110, on the basis of the results obtained from the image orientation sensing circuit 109, controls the layout when image information is written to the memory 108 and controls the order of readout when image information that has been stored in the memory 108 is read out. More specifically, by controlling the initial value of an address counter as well as the incrementing/decrementing of the address at the time of writing and reading, the memory controller 110 executes image reduction processing, write position control, transposition control and read control to obtain a suitably reduced 2-in-1 or 4-in-1 layout. It should be noted that 2-in-1 reduction layout processing is processing for reducing the size of two document images so that the two images can be recorded on one sheet of recording paper, and that 4-in-1 reduction layout processing is processing for reducing the size of four document images so that the four images can be recorded on one sheet of recording paper.

Thus, the image information read in by the CCD 208 is written to the memory 108 via the analog signal processing circuit 112 and luminance/density converting circuit 104 and, when necessary, upon being compressed by the compression/decompression circuit 107. Further, the pixels constructing a character/line-drawing are judged by the character/line-drawing discriminating circuit 105 and the discrimination signal TEXT, which indicates the result of discrimination, is also written to the memory 108 upon being compressed by the compression/decompression circuit 107 when necessary. Thereafter, the image information and discrimination signal TEXT read out of the memory 108 are decompressed by the compression/decompression circuit 107 when necessary, sent to the next stage in sync with the image formation timing of the image forming section and then sent to a PWM circuit 113 via the output masking/UCR circuit 106. The output of the PWM circuit 113 is supplied to a laser driver.

Figure 3:
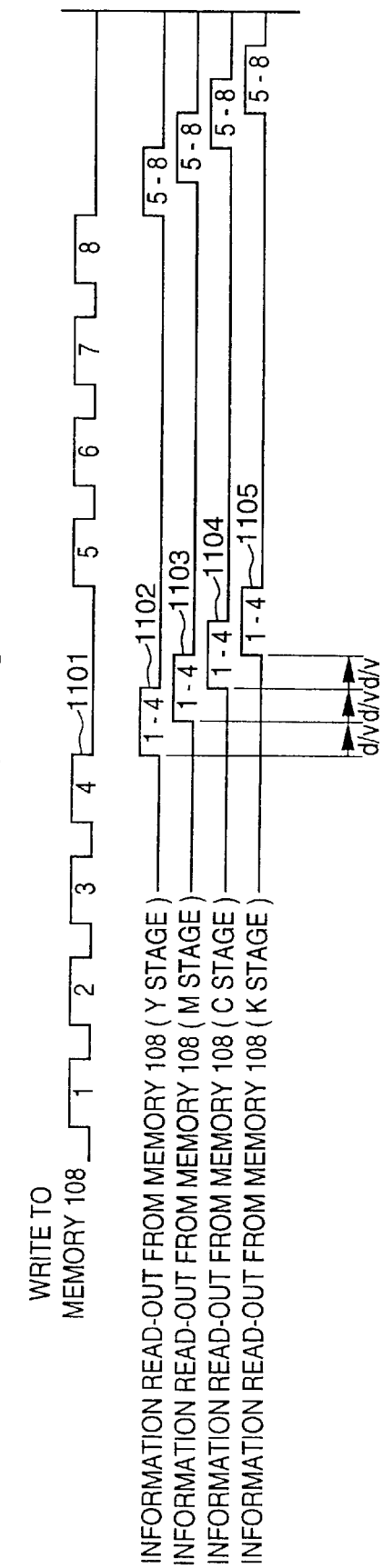
FIG. 3 is a time chart illustrating the write and read timing of a memory shown in FIG. 2.

FIG. 3 is a time chart illustrating the write and read timing of a memory 108. This illustrates an example of the case of the 4-in-1 reduced-image layout.

Four pages of image information read by the CCD 208 are written to the memory 108 successively while being laid out by the memory controller at a timing indicated at 1101 in FIG. 3. The image information that has been written to the memory 108 is read out at timings indicated at 1102 through 1105. The timings indicated at 1102 through 1105 successively differ by time intervals d/V, as shown in FIG. 3. Here d is the difference between neighboring photosensitive drums, which are arranged equidistantly, and V is the velocity of the recording paper conveyed by the conveyance belt 238.

[Image orientation sensing circuit]

Figure 4:
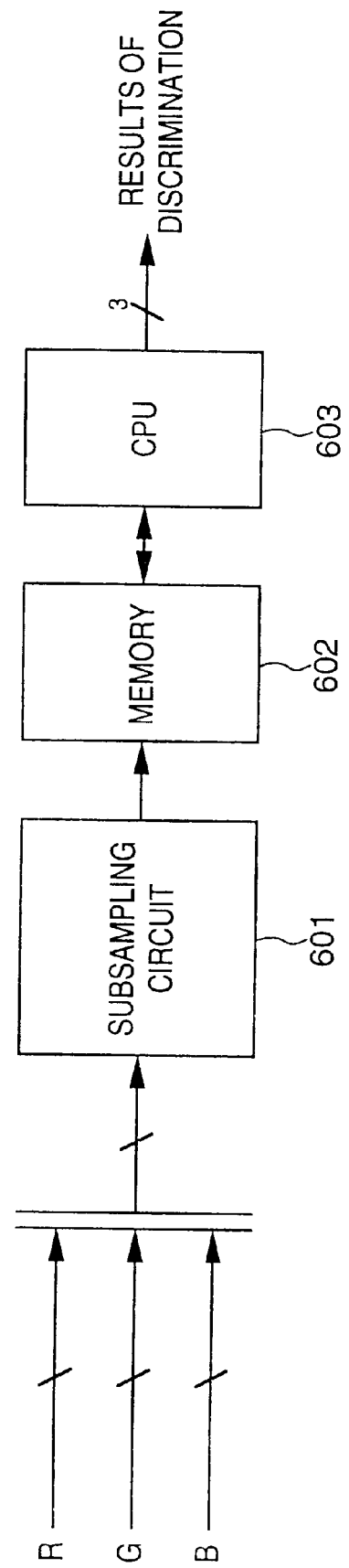
FIG. 4 a block diagram illustrating an example of the construction of an image orientation sensing circuit shown in FIG. 2.

FIG. 4 a block diagram illustrating an example of the construction of the image orientation sensing circuit 109.

The RGB signal indicating the image information of a document is applied to a subsampling circuit 601 which renders the signal monochromatic, culls pixels, effects binarization and reduces the quantity of information sufficiently, whereupon the resulting signal is stored in a memory 602. In accordance with an image orientation discriminating program that has been stored in an internal ROM or the like, a CPU 603, such as a single-chip CPU, employs the internal RAM as a working memory to access the image information that has been stored in the memory 602 and discriminate the orientation and typesetting direction (vertical or horizontal writing) of the image. The CPU 603 outputs the results of discrimination, namely a two-bit code representing the orientation of the image and a one-bit code representing the typesetting direction, for a total of three bits. The internal RAM of the CPU 603 can also be utilized as the memory 602.

A specific method of discriminating image orientation and typesetting direction may employ well-known optical character recognition (OCR) technology, by way of example, and need not be described in detail. In this embodiment, the processing described below is executed upon taking into consideration documents incapable of being sensed and the possibility that documents will be sensed incorrectly.

The images of a plurality of documents supplied by the ADF 200 have their orientations sensed and the orientations of a series of images are determined based, for example, upon the majority of the orientations from the results of sensing each of the series of documents. More specifically, as shown for example in FIG. 5, in a case where a series of document images 1301 through 1304 are read in, these are arranged in the 4-in-1 layout and a copy output of the kind indicated at 1305 is obtained, assuming that a result of the kind indicated at 1306 is obtained as the result of sensing image orientation. Owing to a limitation upon the discrimination capability of the image orientation sensing circuit 109, there are instances where discrimination is not possible, depending upon the document image (document image 1302 in FIG. 5). In such cases the CPU 603 issues a discrimination result indicative of "unknown".

Figure 5:
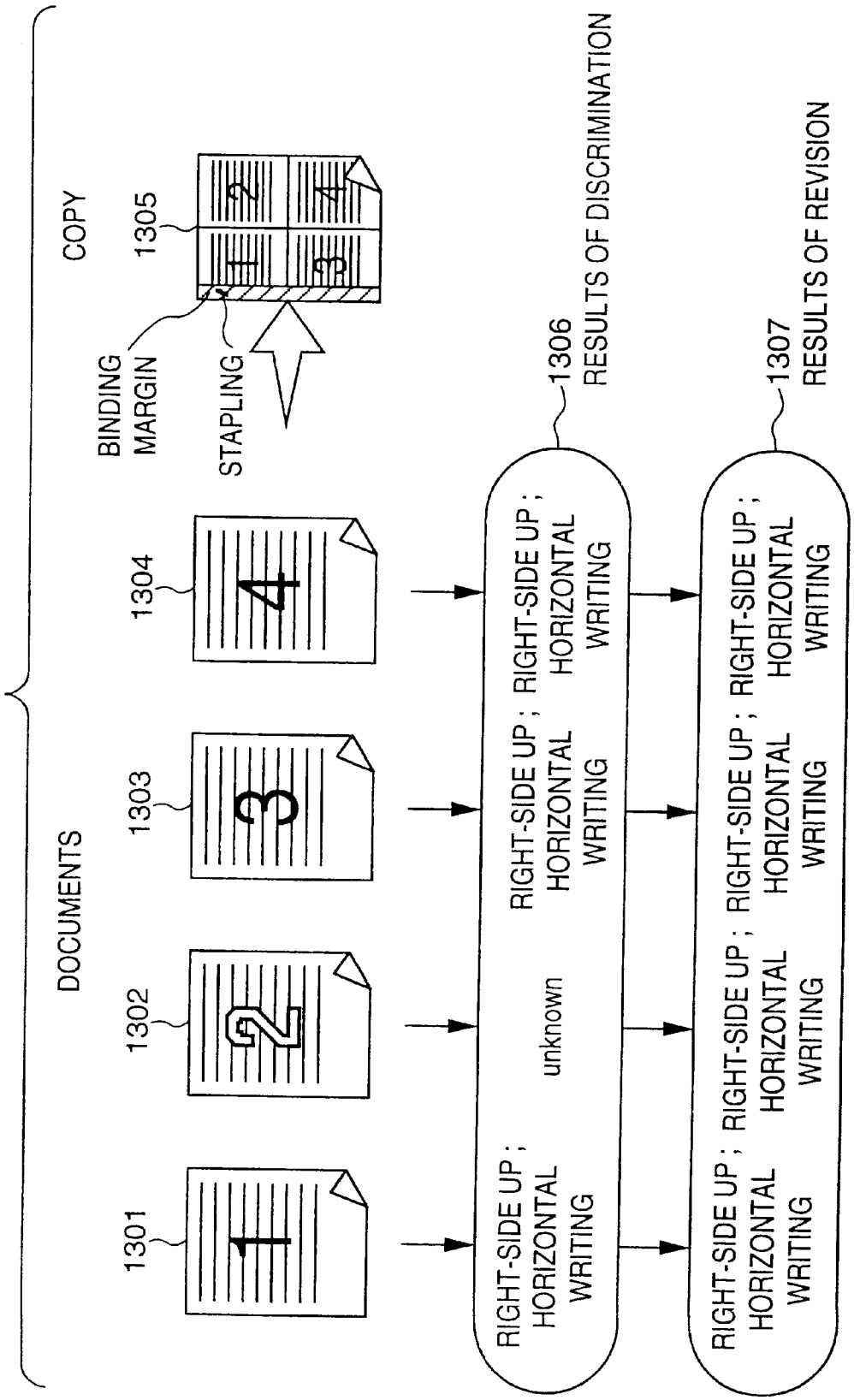
FIG. 5 is a diagram useful in describing a correction method involved in the discrimination of image orientation and typesetting direction.

According to the results of discrimination shown in FIG. 5, the document images 1301, 1303, 1304 are "RIGHT-SIDE UP; HORIZONTAL WRITING", whereas the document image 1302 is "UNKNOWN". In such case there is a strong possibility that the document image 1302 also is right-side up and has horizontal writing because three out of the four document images have been judged to be right-side up with horizontal writing. Accordingly, the results of discrimination are revised, as indicated at 1307 in FIG. 5, in such a manner that the document image 1302 will also be judged to be "RIGHT-SIDE UP; HORIZONTAL WRITING", just as the other document images have been.

Similarly, if the results of discrimination indicate "RIGHT-SIDE UP; HORIZONTAL WRITING" for three out of the four document images and the results of discriminating the other document image indicate "RIGHT-SIDE UP; VERTICAL WRITING", the results of discriminating all four document images are revised to "RIGHT-SIDE UP; HORIZONTAL WRITING".

Thus, first an attempt is made to revise the results of discrimination based upon the majority of document images. If revision based upon the majority of document images is not possible, then the results of discrimination regarding an "UNKNOWN" document image are regarded as being the same as those obtained for the immediately preceding or succeeding document image and the revision is attempted again based upon the majority of document images. Alternatively, the results of discrimination obtained with regard to the first document image are adopted. Another option in a case where revision based upon the majority of document images is not possible is to generate a warning such as an error message. The particular method desired by the user can be set by the user using a control panel, which is not shown.

Figure 6:
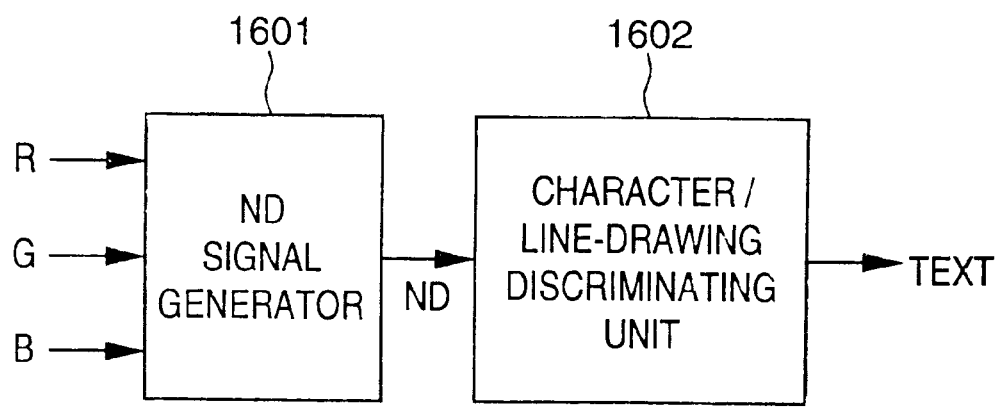
FIG. 6 is a block diagram illustrating an example of the construction of a character/line-drawing detector shown in FIG. 2.

FIG. 6 is a block diagram illustrating an example of the construction of the character/line-drawing detecting circuit 105. The detecting circuit 105 extracts characters and portions of line drawings from the RGB signal that has entered from the analog signal processing circuit 112 and outputs the discrimination signal TEXT whose logic level becomes "1" if a pixel forms part of a character or line drawing and "0" otherwise.

As shown in FIG. 6, the character/line-drawing detecting circuit 105 includes an ND signal generator 1601 which, by performing the multiply-and-accumulate operation indicated by Equation (5) below, generates an ND signal, namely a lightness signal that takes into consideration the visual characteristics of the human eye, from the full-color RGB image signal. It should be noted that d1, d2 and d3 are constants that take into account the visual characteristics of the human eye.

$$ND = \begin{bmatrix} d1 & d2 & d3 \end{bmatrix} \begin{bmatrix} R \\ G \\ B \end{bmatrix} \quad (5)$$

The character/line-drawing detecting circuit 105 includes a character/line drawing discrimination unit 1602 for extracting a character/line-drawing portion from the lightness signal ND and outputs logical "1" in a case where a pixel constructs part of a character or line drawing and logical "0" otherwise. A circuit of this kind is well known and need not be described in detail here.

[Discrimination signal TEXT]

Figure 7:
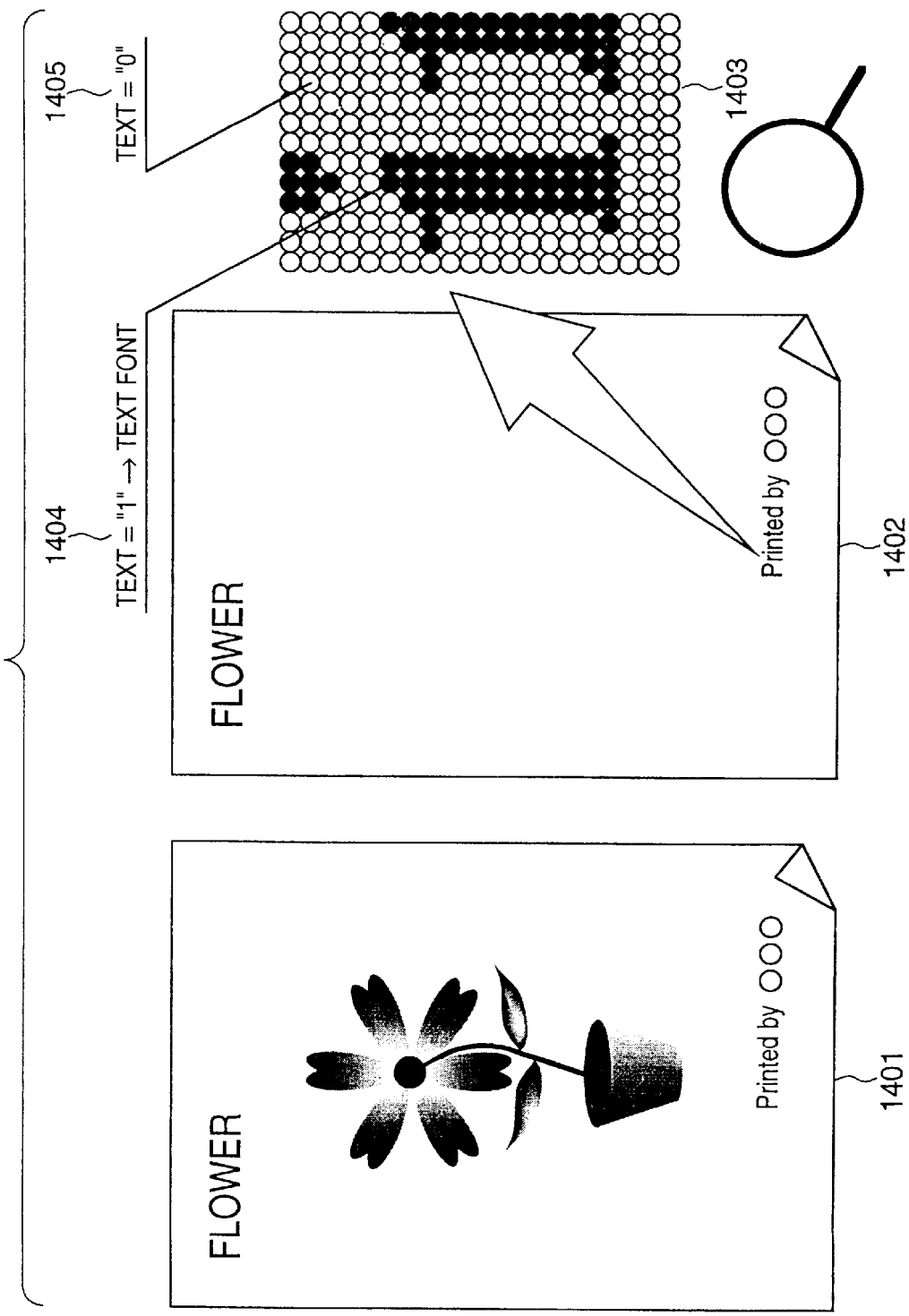
FIG. 7 is a diagram for describing a discrimination signal.

FIG. 7 is a diagram for describing the discrimination signal TEXT. Shown at 1401 is an example of the image of a read document or an image printed out, and shown at 1402 is an image in which the discrimination signal TEXT regarding the image 1401 is illustrated two-dimensionally. More specifically, a character/line-drawing portion in image 1401 is represented by black in image 1402, and other portions are represented by white in image 1402. An image 1403 is obtained by enlarging a portion of the image 1402. Pixels indicated by the black dots at 1404 are pixels which construct part of a character or line drawing. The TEXT signal is "1" for these pixels. On the other hand, pixels indicated by the white dots at 1405 are pixels which construct portions of the image other than the character or line drawing. The TEXT signal is "0" for these pixels.

[PWM circuit]

Figure 8:
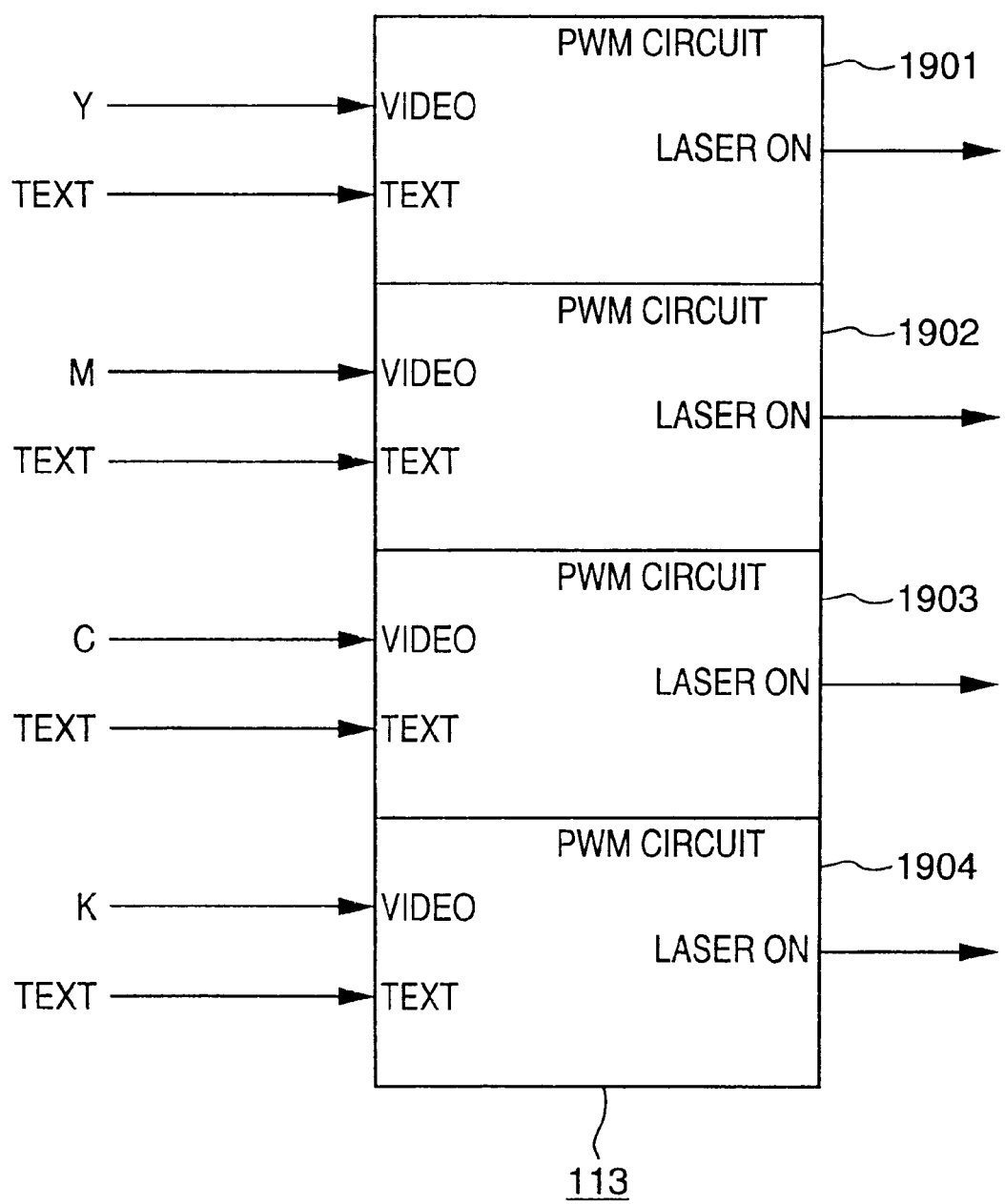
FIG. 8 is a block diagram illustrating an example of the construction of a PWM circuit shown in FIG. 2.

FIG. 8 is a block diagram illustrating an example of the construction of the PWM circuit 113. A PWM circuit 1901 for the color yellow (Y) is supplied with two input signals, namely a digital image signal for yellow (Y) and, in sync with this signal, the discrimination signal TEXT, and generates an analog signal sent to the laser driver that drives a semiconductor laser element for the color yellow (Y). Shown at 1902, 1903 and 1904 are PWM circuits for the colors magenta (M), cyan (C) and black (K), respectively. These are supplied with two input signals, namely a digital image signal for corresponding color component and, in sync with this signal, the discrimination signal TEXT, and generate analog signals sent to laser drivers that drive semiconductor laser elements.

Figure 9:
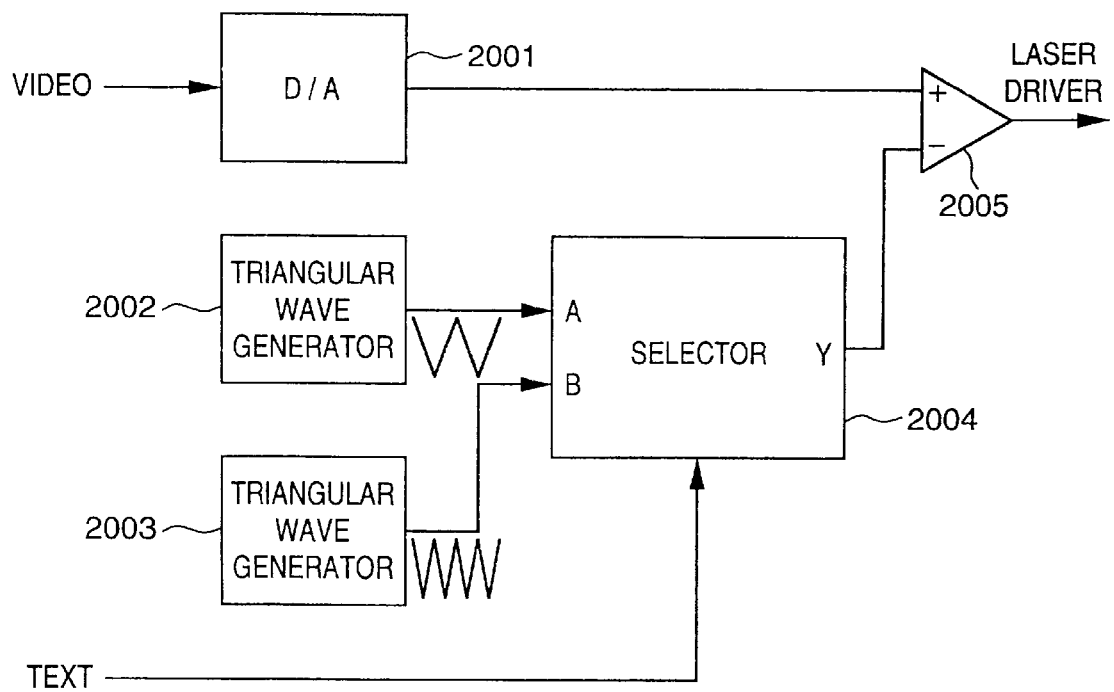
FIG. 9 is a block diagram illustrating an example of the construction of a PWM circuit for each color component.

FIG. 9 is a block diagram illustrating an example of the construction of the PWM circuit for each color component. The circuitry of the PWM circuits is identical regardless of the color component.

As shown in FIG. 9, the PWM circuit includes a D/A converter 2001 for converting the entered digital image signal to an analog image signal, a triangular wave generator 2002, for images for which grayscale is important, for generating a triangular wave having a period of two pixels, a triangular wave generator 2003 for images for which resolution is important, for generating a triangular wave having a period of one pixel, a selector 2004 which, based upon the discrimination signal TEXT, selectively outputs either of these two triangular signals having different periods. More specifically, the selector 2004 selects the number of PWM lines (namely the resolution) based upon the discrimination signal TEXT. The PWM circuit further includes a comparator 2005 for comparing the analog image signal output by the D/A converter 2001 and the triangular wave selected by the selector 2004.

In accordance with the circuitry described above, the triangular wave having the one-pixel period for stressing the resolution of character and line-drawing portions of an image is compared with the analog image signal, and the triangular wave having the two-pixel period for stressing the grayscale of portions of an image other than the character and line-drawing portions is compared with the analog image signal. The output is a pulse-width modulated pulse signal. The pulse signal is sent to the laser driver, which is not shown.

It should be noted that the period of the triangular wave which stresses the grayscale is not limited to two pixels. The period may be set to the equivalent of three or four pixels depending upon the resolution of the image forming section of the apparatus.

Figure 10:
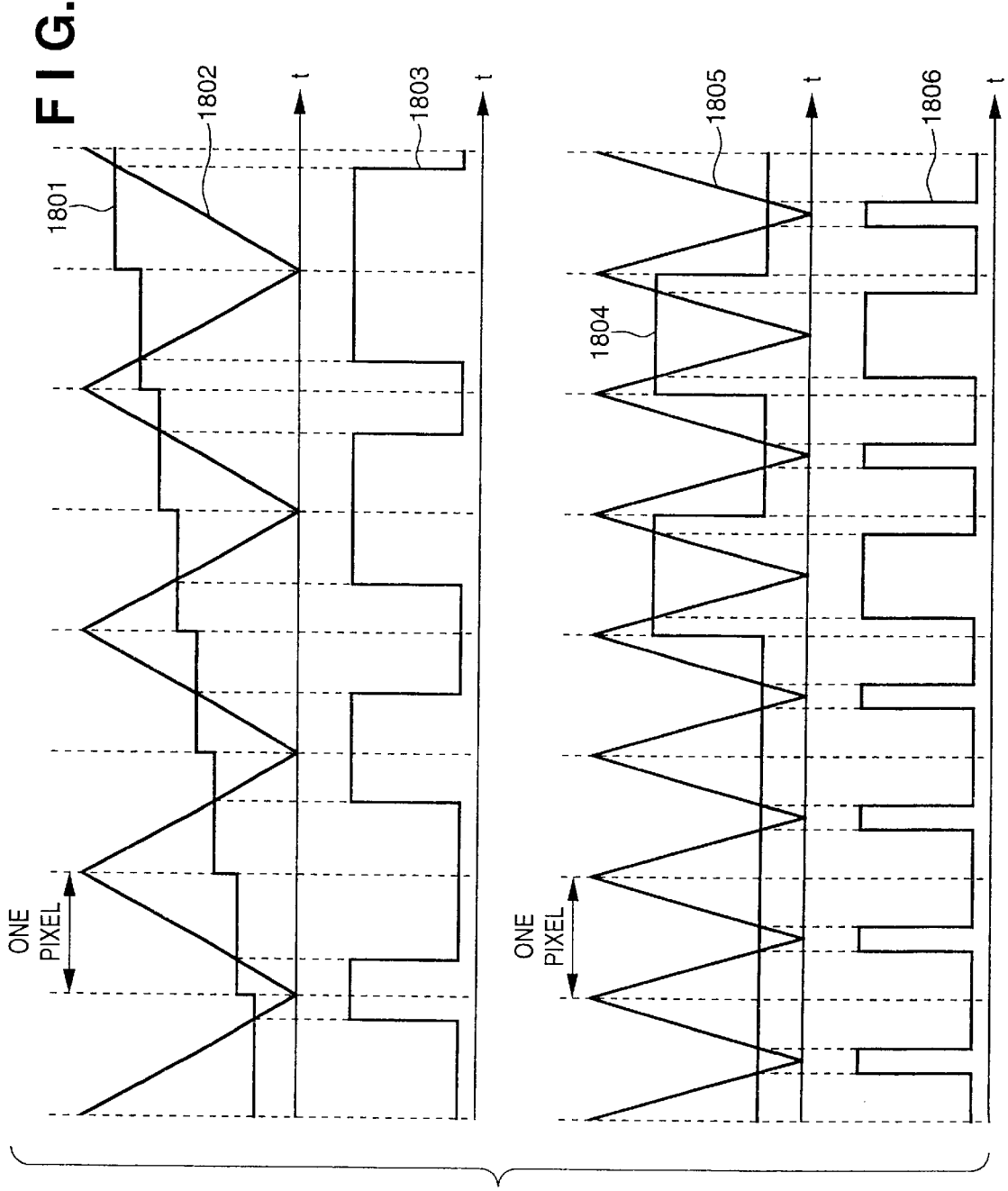
FIG. 10 shows an example of a timing chart associated with the PWM circuit.

FIG. 10 shows an example of a timing chart associated with the PWM circuit. The top half of FIG. 10 illustrates PWM timing in the case where grayscale is important. Here an output 1801 of the D/A converter 2001 and a triangular wave 1802 having a period of two pixels are compared by the comparator 1105, the output of which is a pulse signal 1803. The bottom half of FIG. 10 illustrates PWM timing in the case where resolution is important. Here an output 1804 of the D/A converter 2001 and a triangular wave 1805 having a period of one pixel is compared by the comparator 1105, the output of which is a pulse signal 1806.

[Examples of printout]

Figure 11:
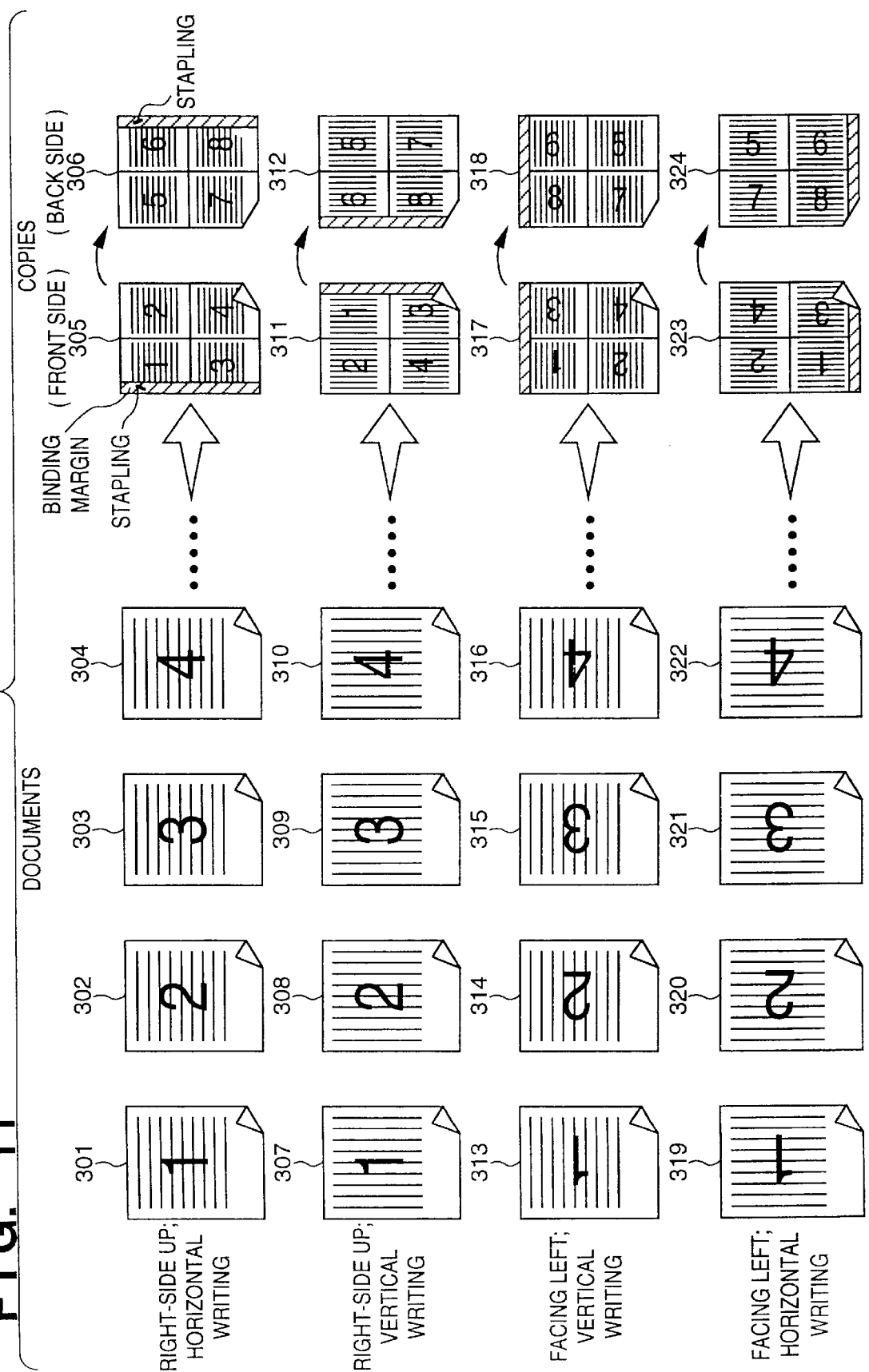
FIG. 11 shows examples of printout according to this embodiment.

FIG. 11 illustrates examples of printout according to this embodiment. Here a 4-in-1 reduced-image layout is made and printing is performed on both sides of the recording paper. According to this embodiment, layout, binding margin and stapling position are controlled as illustrated in dependence upon the image orientation and typesetting direction sensed by the image orientation sensing circuit 109.

Document images 301, 302, 303, 304 . . . in FIG. 11 are judged to be "RIGHT-SIDE UP; HORIZONTAL WRITING". In this case, the images of the first through fourth pages are laid out on the front side of the recording paper at the upper left, upper right, lower left and lower right, in the order mentioned, as indicated at 305. Similarly, document images from the fifth image onward are laid out on the back side of the recording paper, as indicated at 306. A binding margin is added to the left edge of the recording paper on its front side and stapling is performed at desired positions in the binding margin.

Document images 307, 308, 309, 310 . . . in FIG. 11 are judged to be "RIGHT-SIDE UP; VERTICAL WRITING". In this case, the images of the first through fourth pages are laid out on the front side of the recording paper at the upper right, upper left, lower right and lower left, in the order mentioned, as indicated at 311. Similarly, document images from the fifth image onward are laid out on the back side of the recording paper, as indicated at 312. A binding margin is added to the right edge of the recording paper on its front side and stapling is performed at desired positions in the binding margin.

Document images 313, 314, 315, 316 . . . in FIG. 11 are judged to be "FACING LEFT; VERTICAL WRITING". In this case, the images of the first through fourth pages are laid out on the front side of the recording paper at the upper left, lower left, upper right and lower right, in the order mentioned, as indicated at 317. Similarly, document images from the fifth image onward are laid out on the back side of the recording paper upon being transposed (rotated by 180°), as indicated at 318. A binding margin is added to the upper edge of the recording paper on its front side and stapling is performed at desired positions in the binding margin.

Document images 319, 320, 321, 322 . . . in FIG. 11 are judged to be "FACING LEFT; HORIZONTAL WRITING". In this case, the images of the first through fourth pages are laid out on the front side of the recording paper at the lower left, upper left, lower right and upper right, in the order mentioned, as indicated at 323. Similarly, document images from the fifth image onward are laid out on the back side of the recording paper upon being transposed (rotated by 180°), as indicated at 324. A binding margin is added to the lower edge of the recording paper on its front side and stapling is performed at desired positions in the binding margin.

It goes without saying that the proper layout, binding margin and stapling position are obtained also in the case of document images (not shown in FIG. 11) that are upside-down or facing right.

Thus, in accordance with this embodiment, orientations and typesetting directions of document images are discriminated based upon read image information, read image information equivalent to a plurality of documents is stored in memory on the basis of a layout that conforms to the results of discrimination, and the image information that has been stored in the memory is replaced. Accordingly, in a case where 4-in-1 reduced-image layout processing is executed and double-sided printing is performed, a practical layout can be set automatically in dependence upon the image orientations and typesetting directions of the documents that have been placed in the ADF, and a proper binding margin and stapling position can be obtained.

Furthermore, in a case where a document image that cannot be discriminated exists when the orientations and typesetting directions of documents are subjected to discrimination, the results obtained by discriminating the other document images are adopted for the "unknown" document image. This makes it possible to prevent suspension of processing.

Further, in the embodiment described above, the example is one in which reduced-image layout, double-sided printing, binding margin and stapling position are controlled in dependence upon the combination of image orientation and typesetting direction. However, an arrangement can be adopted in which any of the foregoing are controlled as by making a setting using a control panel.

The present invention can be applied to a system constituted by a plurality of devices (e.g., a host computer, interface, reader, printer, etc.) or to an apparatus comprising a single device (e.g., a copier or facsimile machine, etc.).

Further, that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program. In this case, the program codes read from the storage medium implement the functions according to the embodiment, and the storage medium storing the program codes constitutes the invention. Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system (OS) or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiment.

Figure 12:
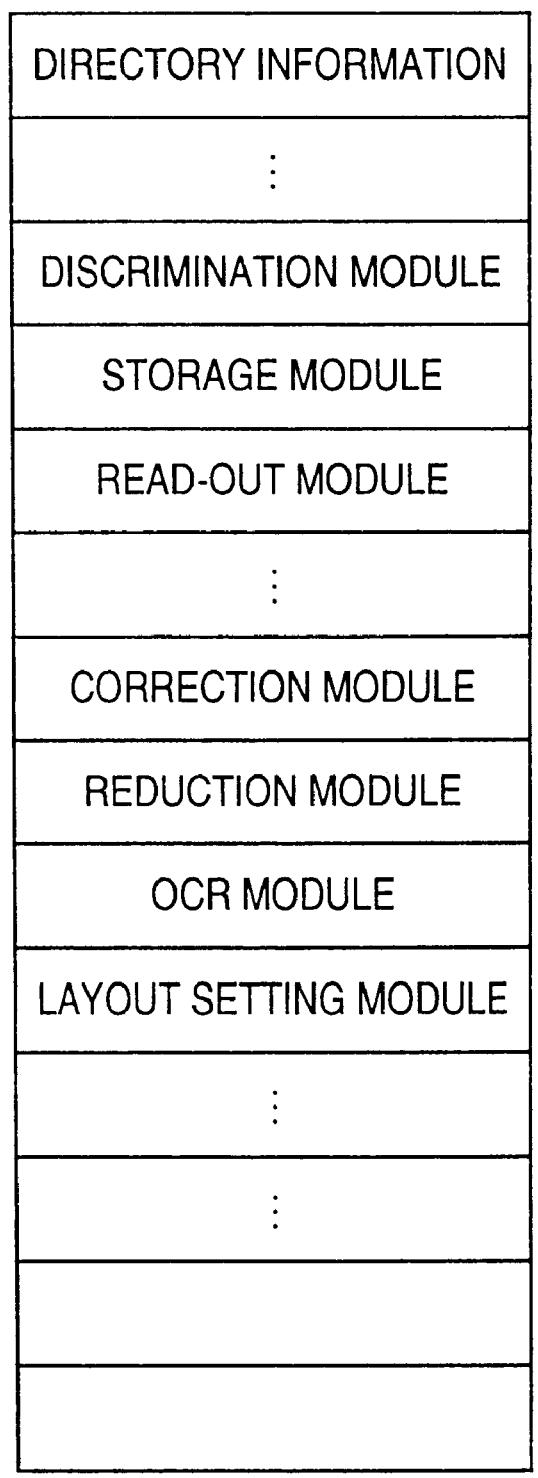
FIG. 12 is a diagram illustrating an example of the memory map of a storage medium storing program codes according to the present invention.

In a case where the present invention is applied to the above-mentioned storage medium, program codes corresponding to the steps of a flowchart are stored on the storage medium. More specifically, modules illustrated in the example of the memory map of FIG. 12 are stored on the storage medium. That is, it will suffice to store program codes of at least "discrimination", "storage" and "read-out" modules on the storage medium.

[Second Embodiment]

Figure 13:
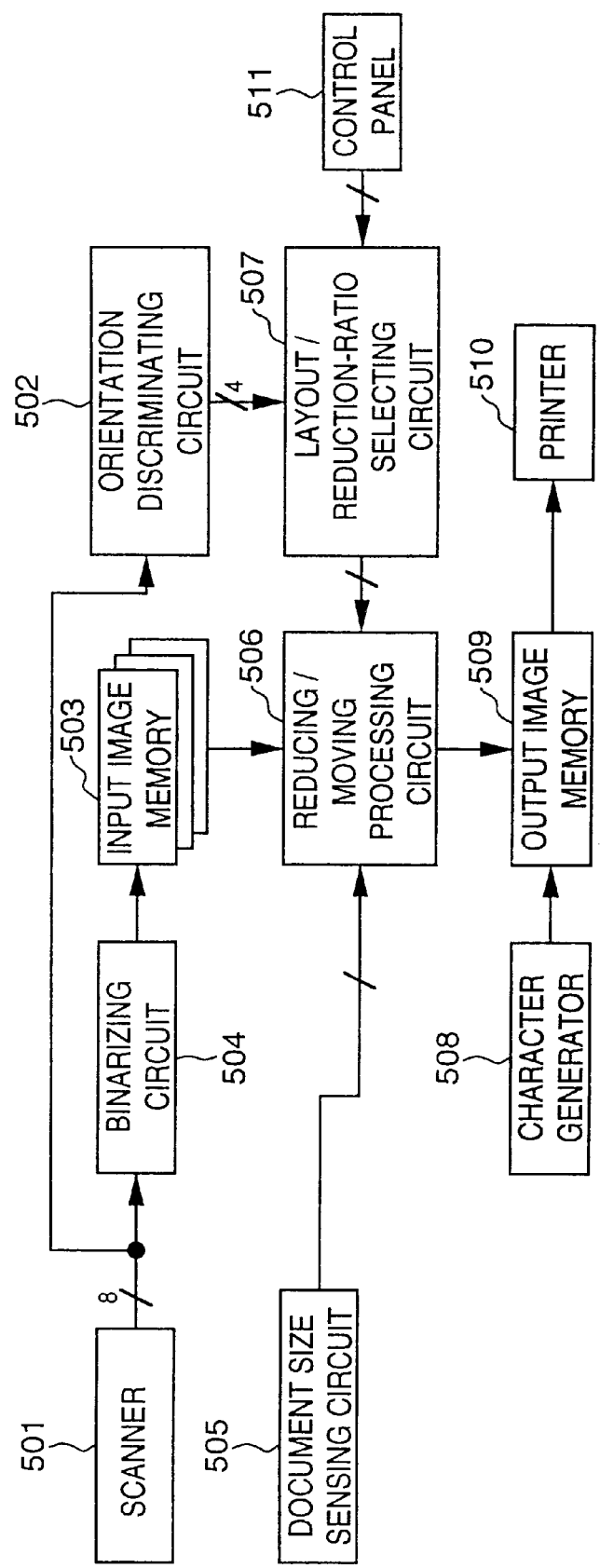
FIG. 13 is a block diagram illustrating an example of the construction of a copier equipped with an image processing apparatus according to a second embodiment of the present invention.

FIG. 13 is a block diagram illustrating an example of the construction of a monochrome copier equipped with an image processing apparatus according to a second embodiment of the present invention.

The copier shown in FIG. 13 has an image memory and various image processing functions and executes image processing such as 2-in-1, 4-in-1, rotation and mirror-image processing. Further, a function for document orientation recognition can be added on by inserting an orientation discriminating circuit (orientation discriminating card) 202 into a functionality extension slot as a functionality extension card.

A scanner 501 reads the image of a document supplied by the ADF or the image of a document placed under the platen cover and outputs grayscale data composed of, say, eight bits. A binarizing circuit 504 subjects the grayscale data, which has entered from the scanner 501, to simple binarization or pseudo-halftone processing and outputs binarized image data. An input image memory 503, which has enough storage capacity to store documents of a plurality of pages, stores the bi-level image data, output by the binarizing circuit 504, in regular order.

An orientation discriminating circuit 502 receives the grayscale data read by the scanner 501 and discriminates the orientation of the document image. The output of the orientation discriminating circuit 502 is composed of four bits representing the results of discrimination, namely a two-bit signal indicating orientation (0°, 90°, 180°, 270°), a one-bit signal indicating typesetting direction (vertical or horizontal writing) and a one-bit signal indicating degree of confidence. The types of signals and the number of bits thereof are exemplary only and do not impose a limitation upon the invention.

A document size sensing circuit 505 senses the size of a document and outputs information indicative of the document size. The document size sensing circuit 505 senses document size based upon transit time of a document supplied by the ADF or based upon the document image read by a sensor provided on the scanner 201 or by the scanner 201. A layout/reduction-ratio selecting circuit 507 selects a layout and reduction ratio in accordance with the results of orientation discrimination output by the orientation discriminating circuit 502, and outputs information indicative of layout and reduction ratio.

A reducing/moving processing circuit 506 generates the addresses of an output image memory 509. On the basis of the document size information that enters from the document size sensing circuit 505 as well as the layout information and reduction ratio that enter from the layout/reduction-ratio selecting circuit 507, the reducing/moving processing circuit 506 outputs image data obtained by applying reduction and moving processing to the bi-level image data read out of the input image memory 503.

A character generator 508 outputs image data indicative of a numeric font, by way of example. The output image memory 509 stores image data output by the reducing/moving processing circuit 506 and image data output by the character generator 508. That is, layout images are stored in the output image memory 509. Further, prescribed characters or symbols are generated by the character generator 508 and stored in the output image memory 509 at prescribed locations thereof, whereby information such as a page number representing the order of an image can be added on to each image laid out in 4-in-1 processing or the like.

A printer 510 forms a visible image on recording paper based upon the image data that has been stored in the output image memory 509. An control panel 511 makes it possible for the user to perform such operations as the setting of a layout.

Figure 14:
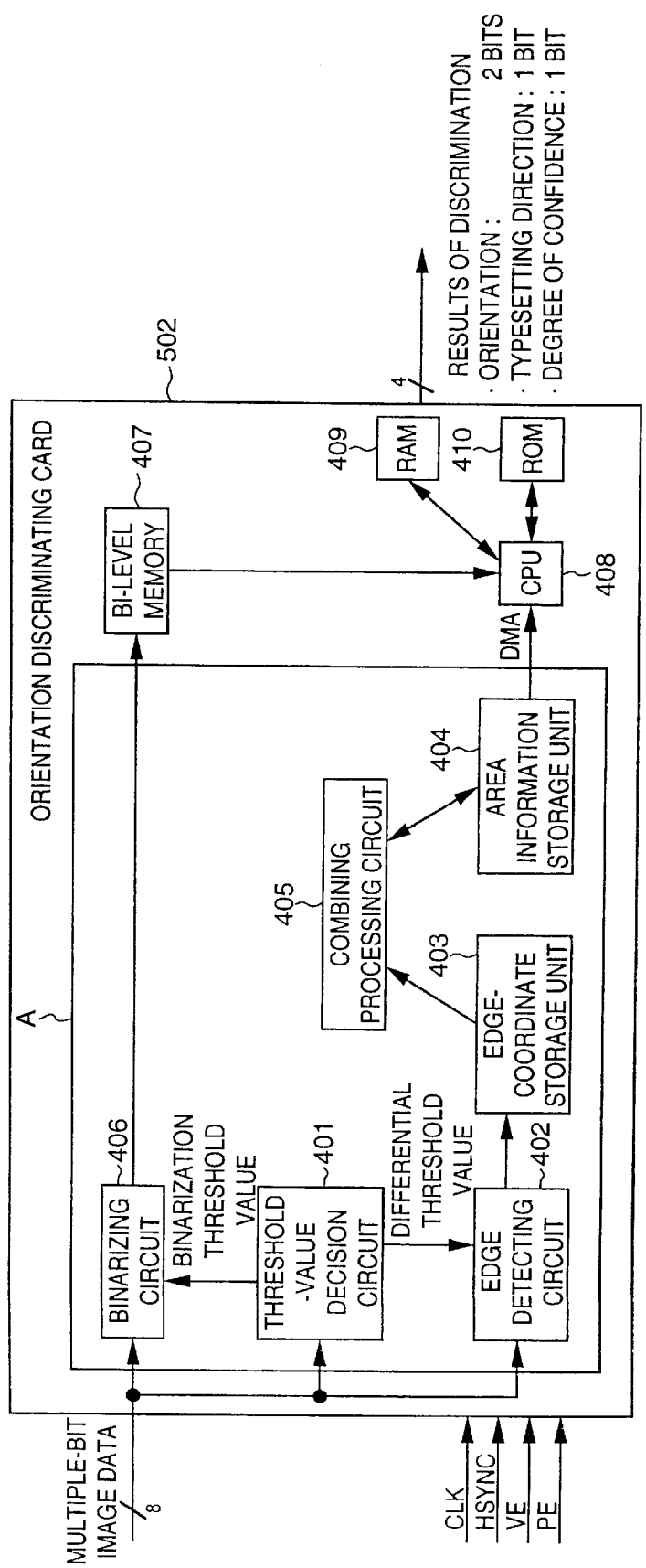
FIG. 14 is a block diagram illustrating an example of the details of construction of an orientation discriminating circuit (orientation discriminating card)

FIG. 14 is a block diagram illustrating an example of the details of construction of the orientation discriminating circuit (orientation discriminating card) 502.

In FIG. 14, a portion enclosed by a rectangle indicated at character A is a character extraction unit formed on a single chip, by way of example.

A threshold-value decision circuit 401 decides a binarization threshold value as well as a differential threshold value, which is for edge detection, from the input multiple-bit pixel data. The binarization threshold value is utilized in the binarization processing executed by a binarizing circuit 406. In sync with a clock CLK, an edge detecting circuit 402 executes processing for detecting high frequency from the input multiple-bit image data using the difference threshold value. An edge-coordinate storage unit 403 stores data indicative of the coordinates of the edge detected by the edge detecting circuit 402. An area information storage unit 404 stores area information created as the result of combining edge coordinates already detected.

Figure 15:
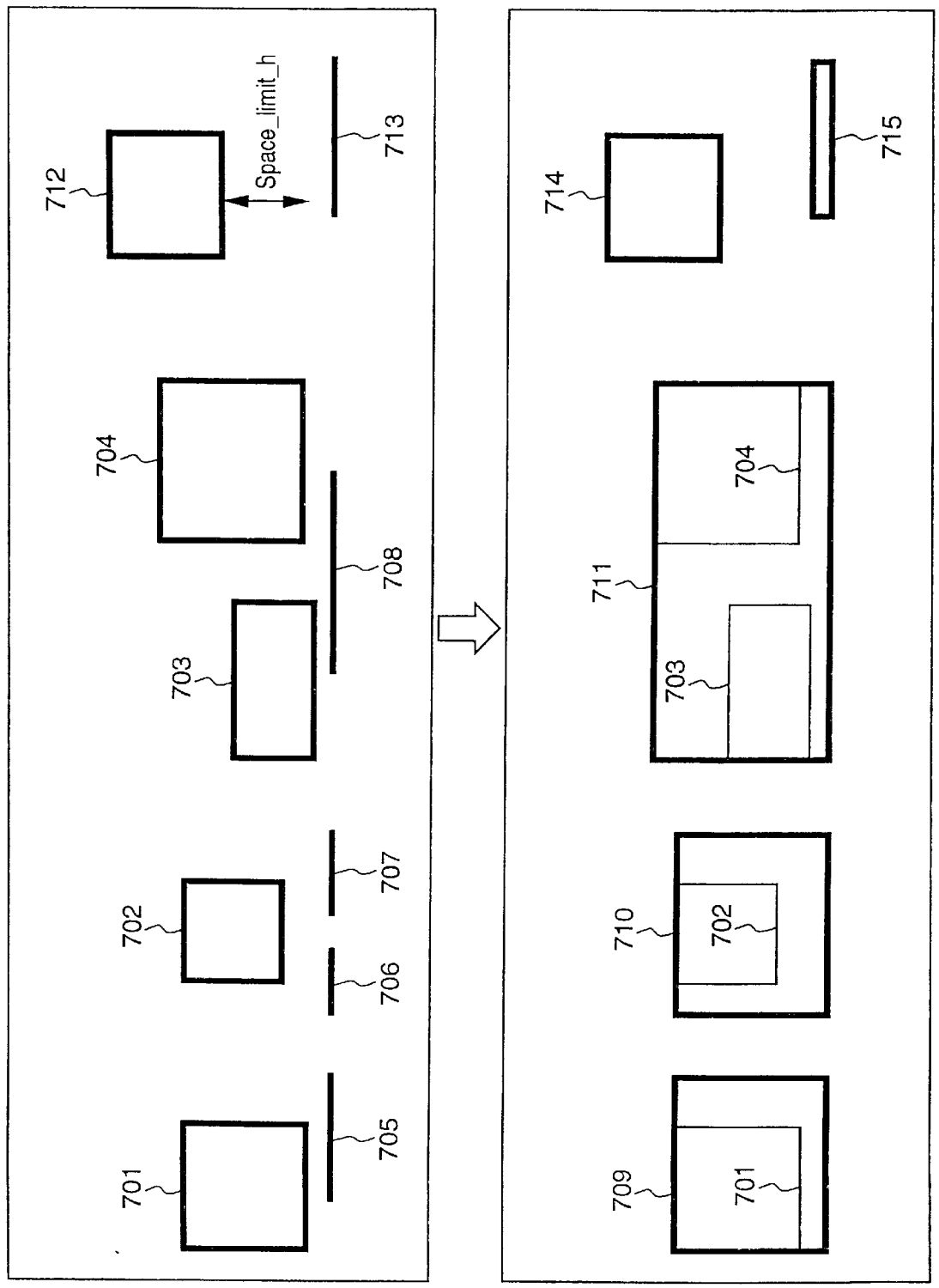
FIG. 15 is a diagram for describing processing executed by a combining processing circuit shown in FIG. 14.

FIG. 15 is a diagram for describing processing executed by a combining processing circuit 405. The combining processing circuit 405 compares coordinate data 701~704 and 712, stored in the edge-coordinate storage unit 403, with coordinate data 705~708 and 713, stored in the area information storage unit 404, combines coordinate data that should be combined in accordance with the judgment made, and stores the combined coordinate data (the areas indicated at 709~715) in the area information storage unit 404.

More specifically, by means of the arrangement indicated at character A in FIG. 14, the entered image data is binarized and stored in a bi-level memory 407, and coordinate data representing this character area is stored in the area information storage unit 404, which is a character-area coordinate memory.

With reference to FIG. 14, a CPU 408, which uses a RAM 409 as a working memory, executes a program stored beforehand in a ROM 410 and, in accordance with the program, reads the coordinate data out of the area information storage unit 404 and executes various processing, such as the reading of bi-level image data out of the bi-level memory 407, in accordance with the coordinate data. More specifically, the CPU 408 executes orientation discrimination processing in accordance with a character recognition program that has been stored in the ROM 410 and, when the discriminating operation has been concluded, outputs the results of orientation discrimination.

Figure 17:
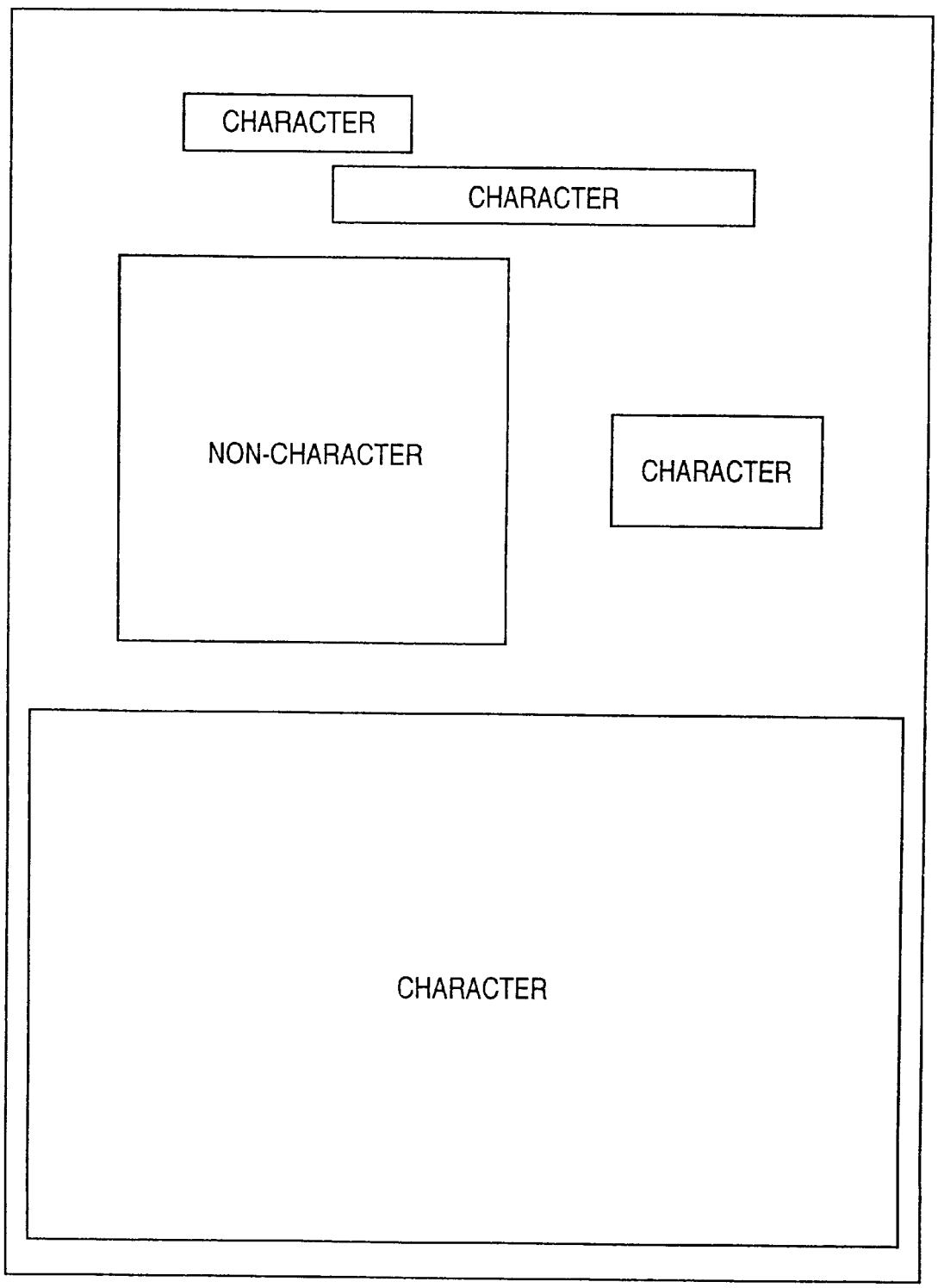
FIG. 17 is a diagram for describing character detection processing.

For example, when character detection processing is applied to image data representing a document of the kind shown in FIG. 16, rectangle information of the kind shown in FIG. 17 is obtained. In accordance with the coordinate data that has been stored in the area information storage unit 404, the CPU 408 reads image data out of the bi-level memory 407 and executes OCR processing. The CPU 408 applies four-direction OCR processing to the bi-level image data of each character area read out of the bi-level memory 407, adopts, as the orientations of the character areas, the orientations for which results closest to character information that has been stored as a dictionary in the ROM 410 are obtained, and outputs the results of discrimination.

Figure 18:
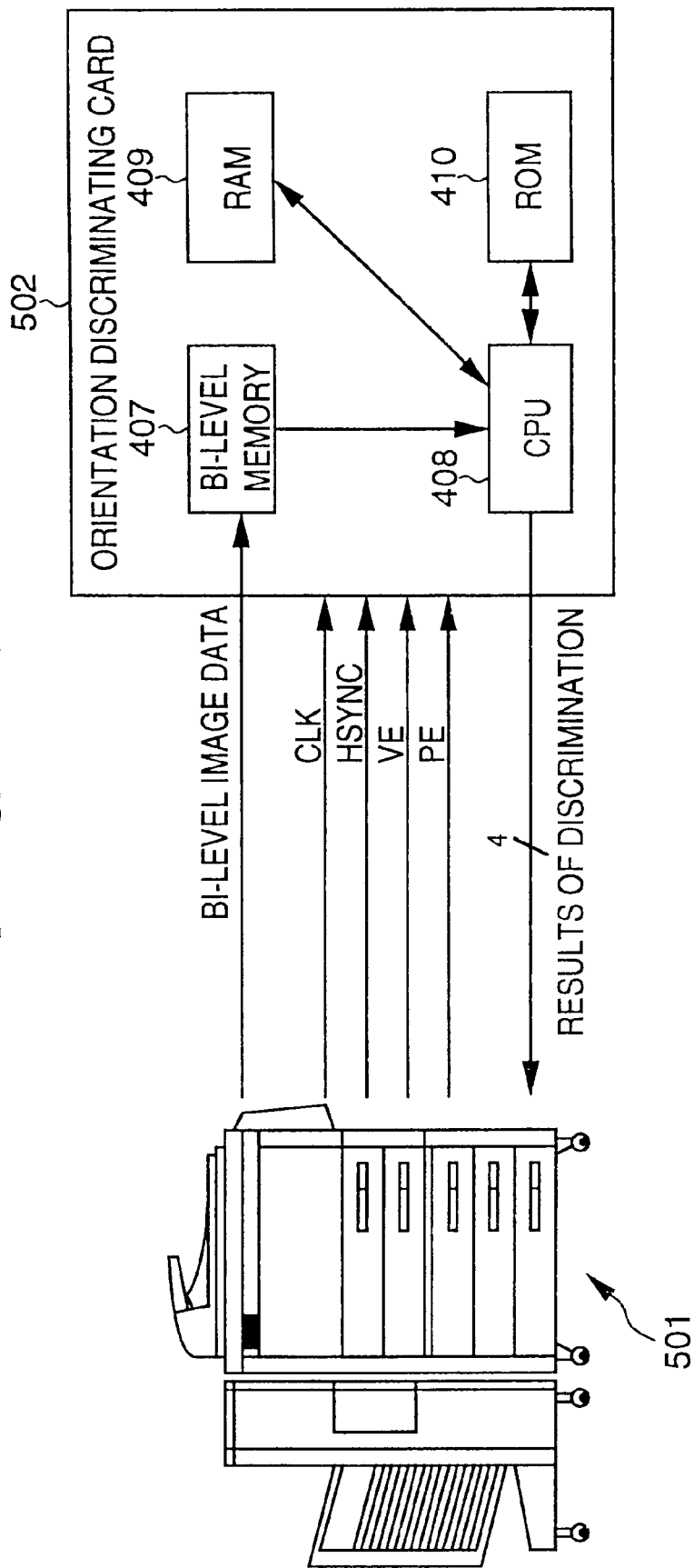
FIG. 18 is a block diagram illustrating a second example of the construction of an orientation discriminating card.

FIG. 18 is a block diagram illustrating a second example of the construction of the orientation discriminating card 502. This is an arrangement in which processing for orientation discrimination is implemented by software that has been stored in the ROM 410. The software for discriminating orientation can be software which discriminates character areas and employs an OCR to discriminate orientation, or software which analyzes the layout to discriminate orientation.

Figure 19:
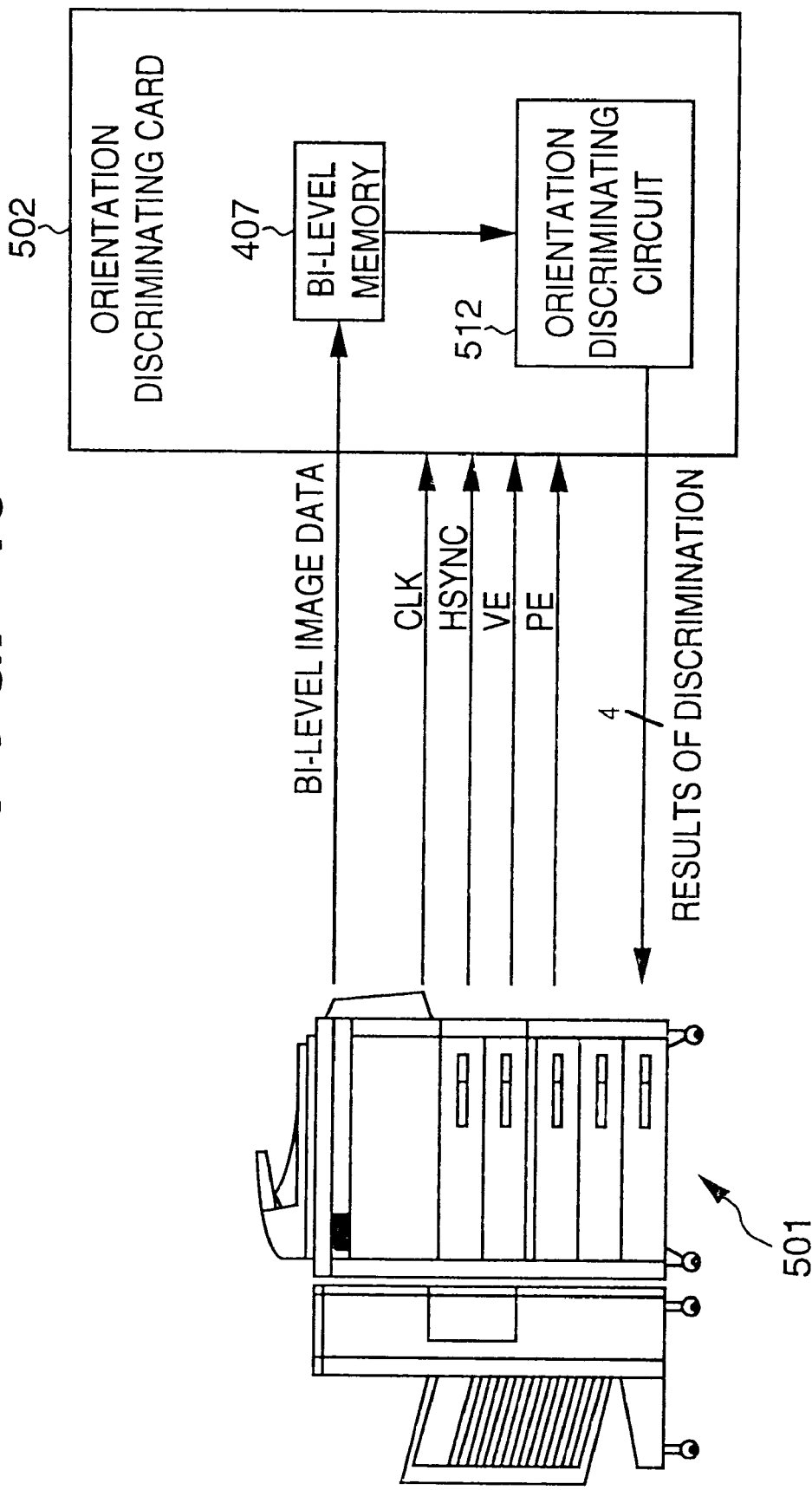
FIG. 19 is a block diagram illustrating a third example of the construction of an orientation discriminating card.

FIG. 19 is a block diagram illustrating a third example of the construction of the orientation discriminating card 502. This is an arrangement in which processing for orientation discrimination is implemented by hardware (an orientation discriminating circuit 512). As in the case of the software mentioned above, examples of the hardware that can be used is hardware which discriminates character areas and employs an OCR to discriminate orientation, or hardware which analyzes the layout to discriminate orientation.

In the arrangements illustrated in FIGS. 18 and 19, it is of course possible to provide the orientation discriminating card 502 with the binarizing circuit 504 and binarize the multiple-bit image data that enters from the copier 501. Further, the orientation discriminating circuit 502 may be provided with a multiple-bit band memory (or page memory) and orientation may be discriminated by software based upon the multiple-bit image data that enters from the copier 501.

Figure 20:
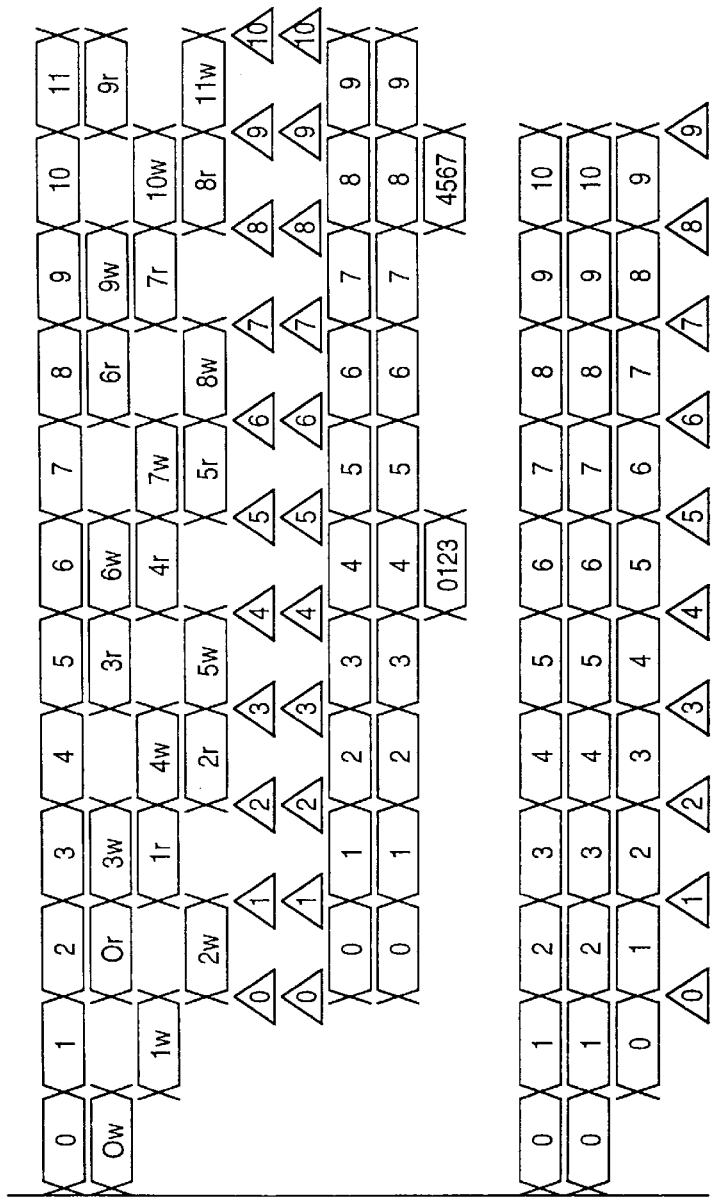
FIG. 20 is a diagram illustrating an example of a timing chart of this system.

FIG. 20 is a diagram showing an example of a timing chart of this system. Shown at 801 is the timing of the image input from an image scanner (CCD), and shown at 802 through 804 are the timings at which binarized image data is input to and output from the input image memory 503 for three pages of data, by way of example. More specifically, 0th, 3rd, 6th, . . . bi-level image data is stored on the first page of the input image memory 203, 1st, 4th, 7th, . . . bi-level image data is stored on the second page and 2nd, 5th, 8th, . . . bi-level image data is stored on the third page.

Shown at 805 is the timing of orientation discrimination processing. The results of discriminating orientation are output at the timings indicated by the triangle marks. Shown at 806 is the timing of layout selection processing. Layout is selected based upon the results of orientation discrimination and document size information, and the results of selection are outputted at the timings indicated by the triangle marks. Shown at 807 is the timing of reduction processing. This is the timing at which bi-level image data is successively read out of the input image memory 503, reduction processing is executed and the reduced-image data is output. Shown at 808 is the write timing of the output image memory, namely the timing at which the reduced-image data is written at the designated address of the output image memory 509. Shown at 809 is the read-out timing of the output image memory, namely the timing at which image data that has been stored in the output image memory 509 is output to the printer 510. Since four pages, for example, of reduced image data have been stored in the output image memory 509, zero to third items of reduced image data are read out by a single reading operation and output to the printer 510 as a matter of course, as illustrated at 809 in FIG. 20.

The timings of processing for character extraction executed by the orientation discriminating card 502 are shown at 810 through 813. Specifically, binarizing processing timing 810 is the timing at which an entered grayscale image is binarized and written to the bi-level memory 407. Character-extraction processing timing 811 is the timing at which character areas are extracted from the entered grayscale image and written to the area information storage unit 404. OCR processing timing 812 is the timing at which bi-level image data that has been stored in the bi-level memory 407 and area information that has been stored in the area information storage unit 404 are read out and character recognition processing is executed in four direction to determine orientation. Output timing 813 is the timing at which the results of orientation discrimination [image orientation and typesetting direction (vertical or horizontal writing)] are output.

FIGS. 21 through 24 are diagrams illustrating examples in which 4-in-1 processing has been executed by a copier equipped with the image processing apparatus of this embodiment.

Figure 21:
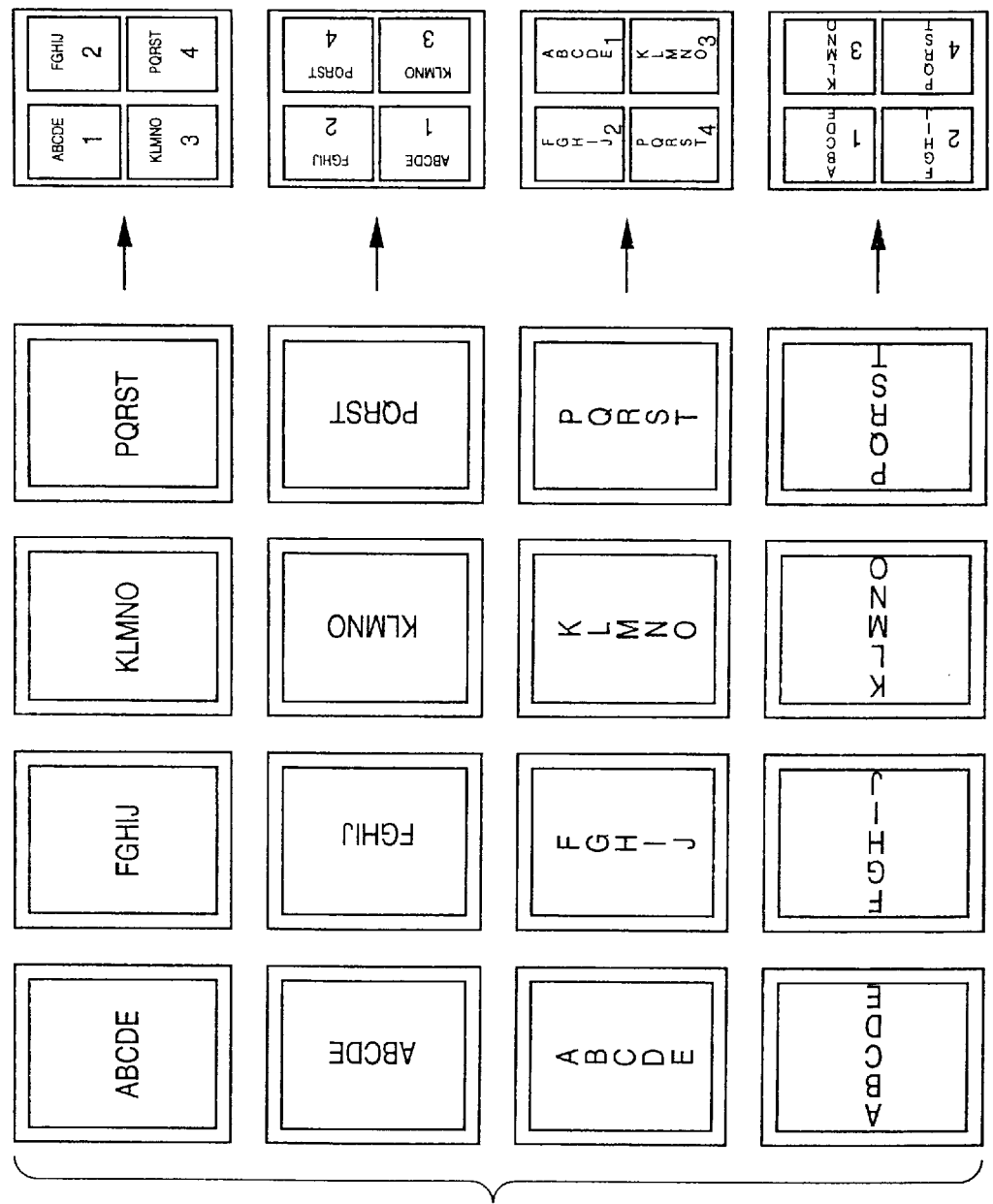
FIG. 21 is a diagram illustrating an example in which 4-in-1 processing has been executed by a copier equipped with the image processing apparatus of this embodiment.

Specifically, in accordance with this embodiment, an excellent layout can be decided automatically in accordance with the image orientation and typesetting direction (vertical or horizontal writing), as illustrated in the example of FIG. 21, by discriminating orientation and typesetting direction. Furthermore, since page numbers indicating the order in which the images were read in are added on, the order in which the images should be viewed can be comprehended correctly and with ease.

Figure 22:
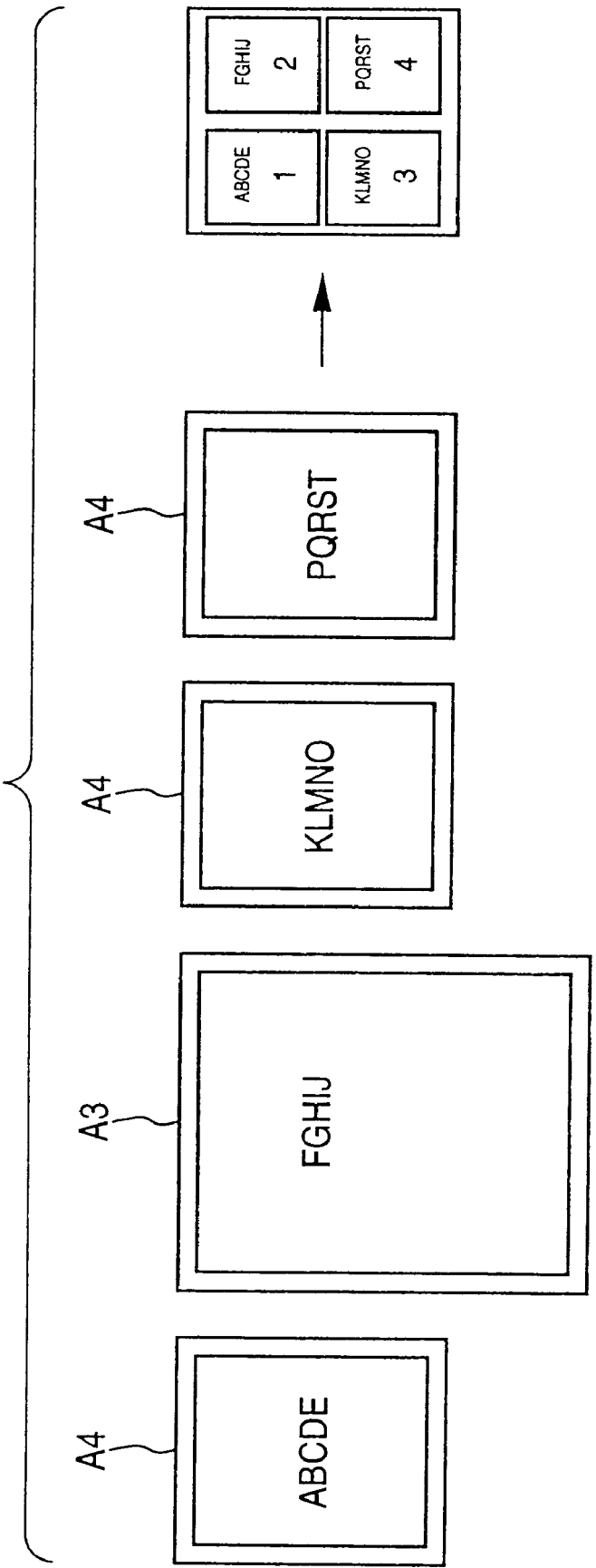
FIG. 22 is a diagram illustrating an example in which 4-in-1 processing has been executed by a copier equipped with the image processing apparatus of this embodiment.

Further, document sizes are sensed, the reduction ratios are decided in dependence upon the sizes sensed and images that have been read in are reduced in size. As a result, even if documents of sizes A3 and A4 are mixed, as illustrated in the example of FIG. 22, suitable output images can be obtained by enlarging the reduction ratio of the A3-size document.

Figure 23:
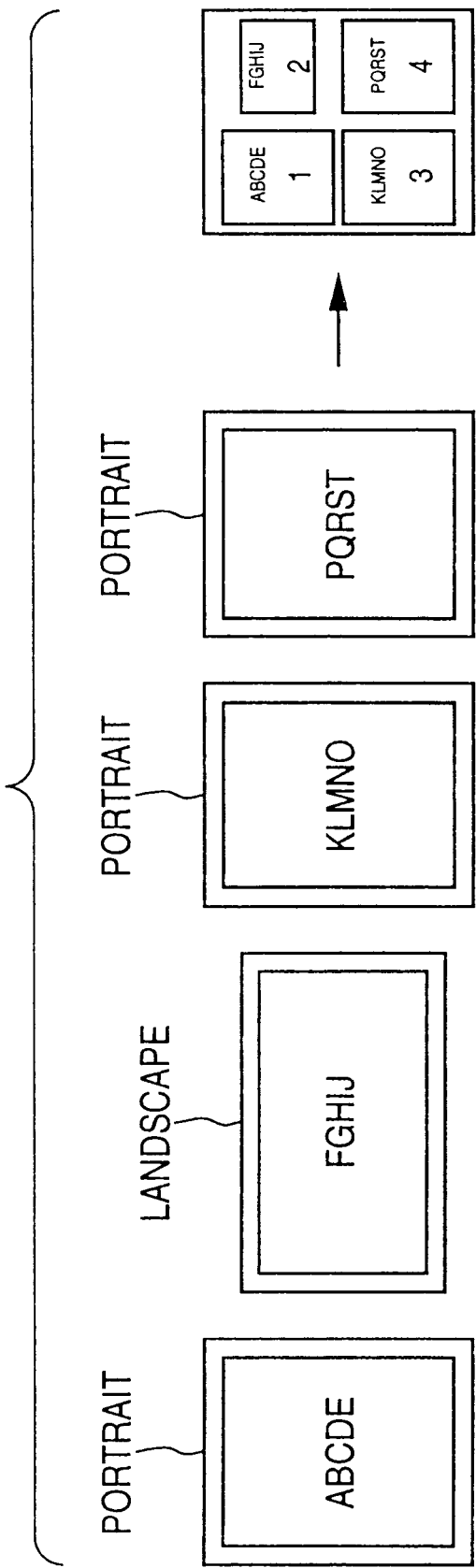
FIG. 23 is a diagram illustrating an example in which 4-in-1 processing has been executed by a copier equipped with the image processing apparatus of this embodiment.

Further, image orientations are discriminated, reduction ratios are decided in dependence upon the orientations discriminated and images that have been read in are reduced. As a result, even if document images of size A4 landscape and size A4 portrait are mixed, suitable output images can be obtained by enlarging the reduction ratio of either image (the size A4 landscape image in the example of FIG. 23) as illustrated in the example of FIG. 23. Whether the reduction ratio of the landscape or portrait image is to be enlarged can be decided depending upon whichever of the documents is greater in number.

Figure 24:
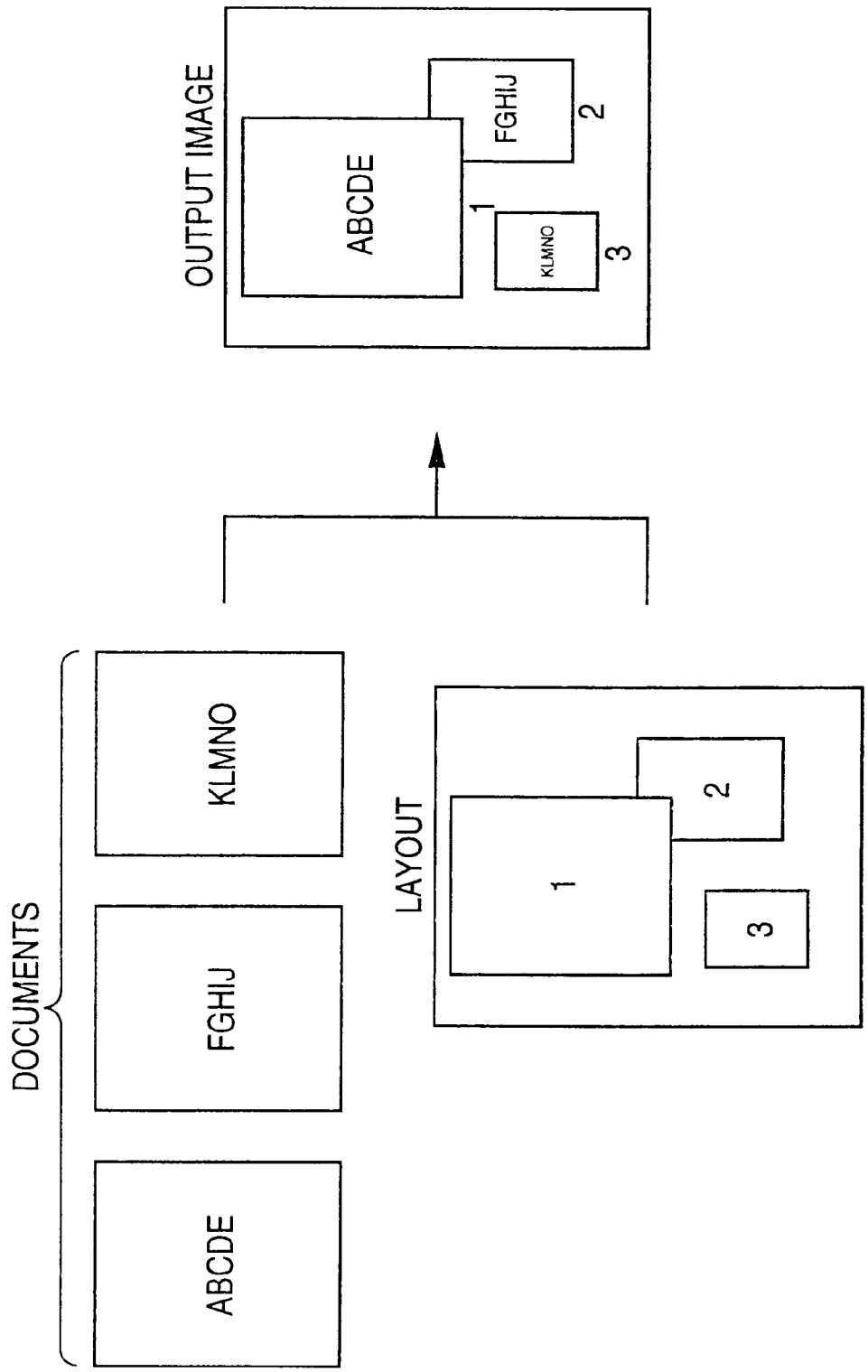
FIG. 24 is a diagram illustrating an example in which 4-in-1 processing has been executed by a copier equipped with the image processing apparatus of this embodiment.

Furthermore, since the user is capable of deciding the layout by using the control panel 511, it is possible to execute 2-in-1 or 4-in-1 processing according to the layout desired by the user, as illustrated in the example of FIG. 24.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program. In this case, the program codes read from the storage medium implement the functions according to the embodiment, and the storage medium storing the program codes constitutes the invention. Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system (OS) or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiment.

In the second embodiment set forth above, an example is described in which the circuit for binarizing the input image data and the memory for storing the binarized image data are provided in the copier and on the orientation discriminating board 502, respectively. However, these can be combined into a single unit.

Figure 25:
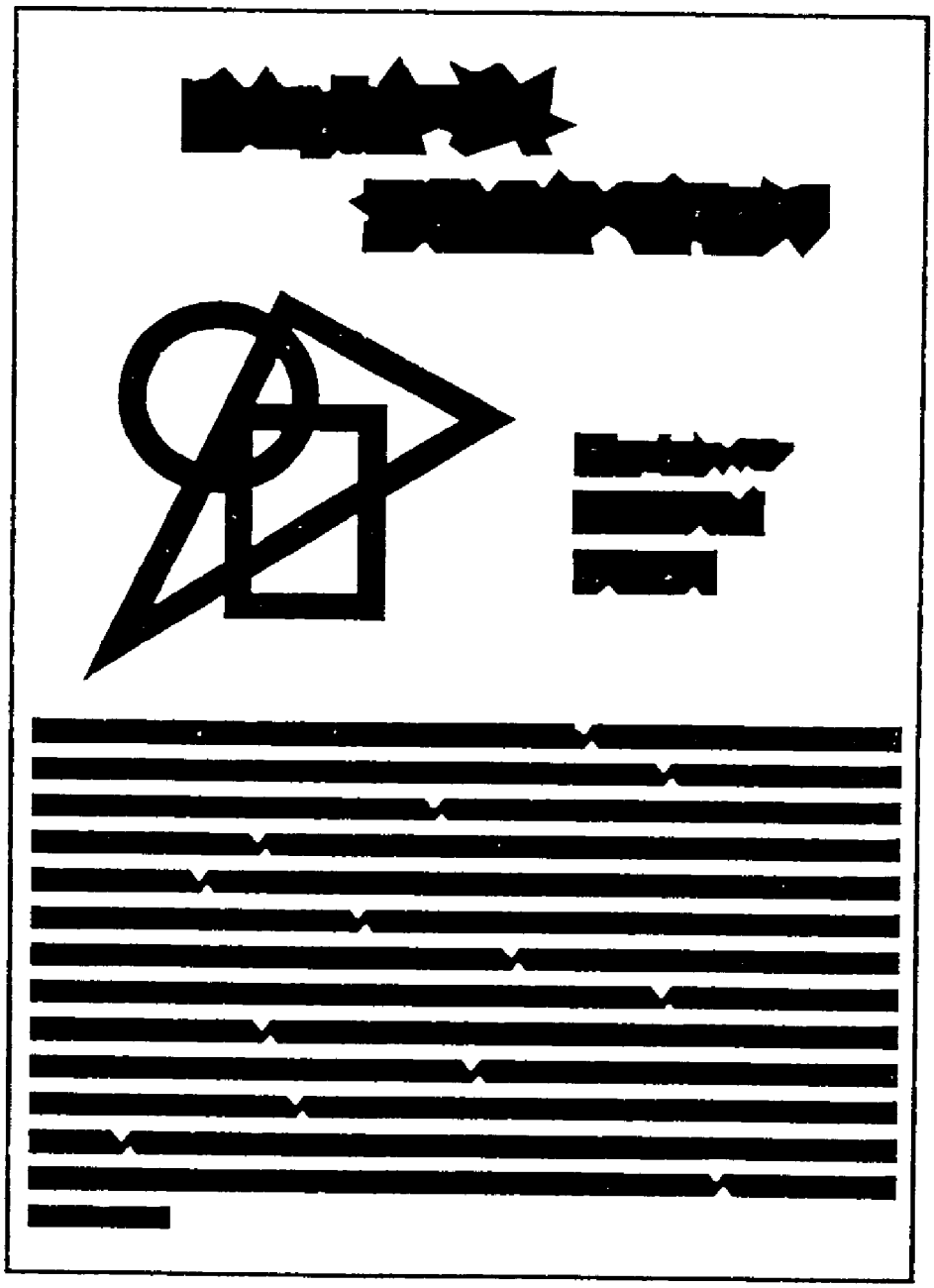
FIG. 25 is a diagram for describing another method of character extraction processing.
Figure 26:
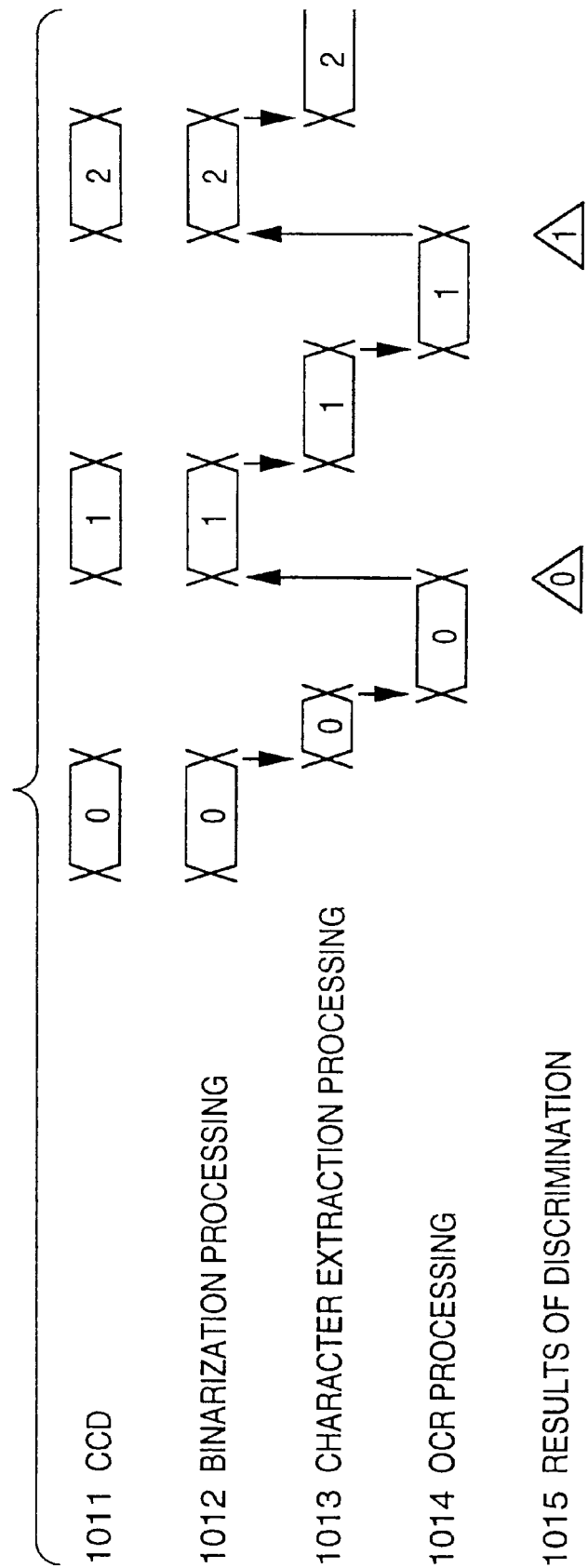
FIG. 26 is an example of a time chart in a case where the processing shown in FIG. 25 is executed.

Further, in the second embodiment, an example is described in which characters are extracted from a multiple-bit image. However, characters may be extracted from a bi-level image. One example of this is shown in FIG. 25. Specifically, the method includes generating an image of reduced resolution of the kind shown in FIG. 25, connecting mutually adjacent characters and tracing the resulting outline, and judging that an area is a character area if the length-to-width ratio of the individual connected area is large. An example of the timechart for this case is illustrated in FIG. 26.

In the second embodiment described above, an example is described in which reduction processing is executed at the timing shown at 807 in FIG. 20. However, reduction may be performed when the image is entered by the scanner 501. In such case the reduction can be performed optically in regard to the auxiliary scanning direction, thus providing excellent quality. In addition, the processing load is reduced. However, since the reduction ratio must be decided prior to the input of the image, not all of the mixed landscape and portrait images can be placed in the correct orientations (i.e. there is the possibility that some will be turned upside-down).

Furthermore, encoded and compressed image data can be stored in memories which store the input image, bi-level image and output image, and the image can be restored by performing decoding and decompression when the stored data is read out. If this arrangement is adopted, the memory size of each memory of each memory can be reduced. Further, if memory size is kept the same, a larger number of pages of images can be stored. This means that layout processing such as 6-in-1 and 8-in-1 processing can be executed in addition to 4-in-1 processing.

Figure 27:
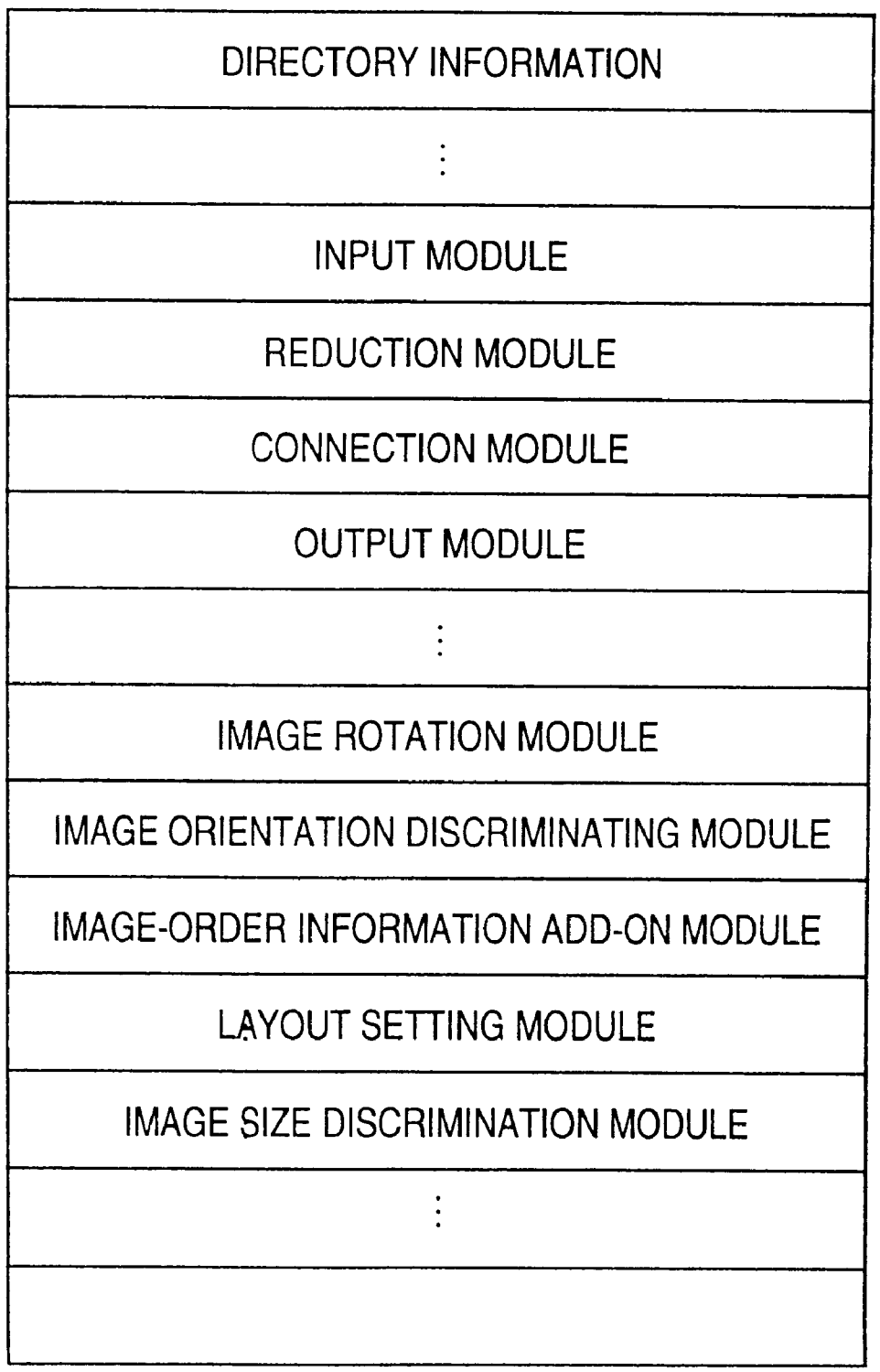
FIG. 27 is a diagram illustrating an example of the memory map of a storage medium storing program codes according to the present invention.
Figure 28:
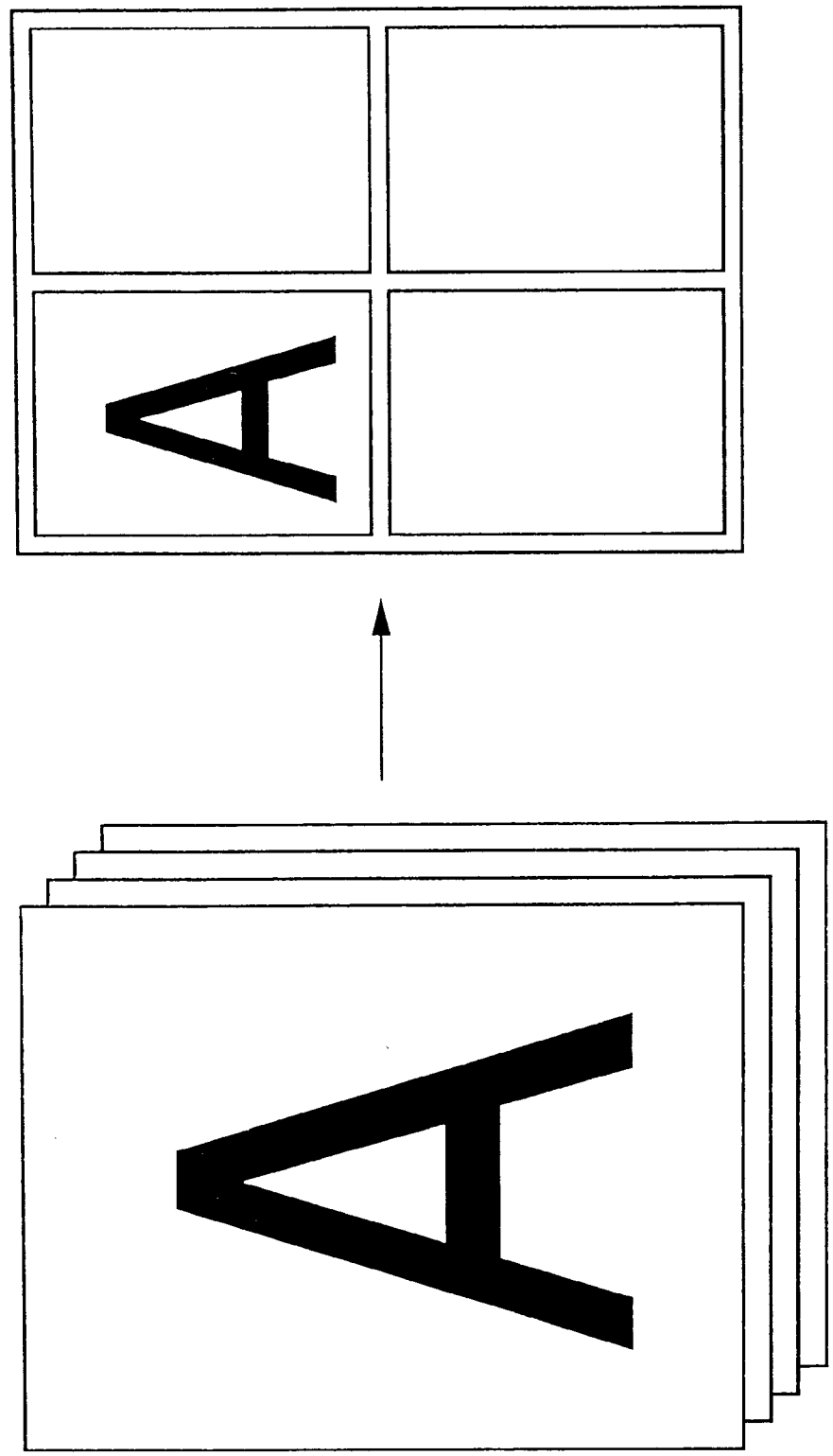
FIG. 28 is a diagram useful in describing the prior art.

In a case where the present invention is applied to the above-mentioned storage medium, program codes corresponding to the steps of a flowchart are stored on the storage medium. More specifically, modules illustrated in the example of the memory map of FIG. 27 are stored on the storage medium. That is, it will suffice to store program codes of at least "input", "reduction", "connection" and "output" modules on the storage medium.

Thus, as described above, images of a plurality of documents can be formed on the same sheet of recording paper even if images of different sizes are mixed.

Further, in a case where landscape-format documents and portrait-format documents of the same size are mixed, the images can be oriented uniformly and then a plurality of these image of the documents can be formed on the same sheet of recording paper.

In a case where images of a plurality of documents have been formed on the same sheet of recording paper, information indicating the order of the images can be added to the images.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting a document image;

first detecting means for detecting orientation of the document image that has been input by said input means;

second detecting means for detecting size of the document image that has been input by said input means; and image processing means for reducing the document image that has been input by said input means, at a magnification according to detection results obtained by said first and second detecting means, and arranging a plurality of document images as a single image.

2. The apparatus according to claim 1, wherein said first detecting means detects orientation based upon characters in the document image.

3. The apparatus according to claim 2, wherein said first detecting means detects orientation by an optical character recognition unit.

4. The apparatus according to claim 1, wherein said image processing means arranges the plurality of document images inclusive of a landscape-type document image and a portrait-type document image.

5. The apparatus according to claim 4, wherein said image processing means arranges the plurality of document images upon making orientations thereof the same.

6. The apparatus according to claim 1, wherein said image processing means arranges the plurality of document images inclusive of document images of different sizes.

7. The apparatus according to claim 1, wherein said image processing means connects the plurality of document images.

8. The apparatus according to claim 1, wherein said image processing means adds a document page number onto the document image.

9. The apparatus according to claim 1, wherein said image processing means reduces the document image at a magnification that is independent for each document.

10. The apparatus according to claim 1, wherein said input means is a scanner.

11. The apparatus according to claim 1, wherein images arranged by said image processing means are printed by a printer.

12. An image processing apparatus comprising:

input means for inputting a document image;

detecting means for detecting orientation of the document image that has been input by said input means; and image processing means for arranging a plurality of document images as one image in dependence upon detection results obtained by said detecting means;

wherein in response to presence of a document image whose orientation cannot be detected by said detecting means, said image processing means arranges this document image based upon an assumption that the orientation thereof is the same as the orientations of other document images to be arranged together with this document image.

13. An image processing method comprising:

an input step of inputting a document image;

a step of detecting orientation of the document image that has been input at said input step;

a step of detecting size of the document image that has been input at said input step; and an arranging step of reducing the document image, which has been input at said input step, at a magnification according to detection results obtained at said orientation detecting step and size detecting step, and arranging a plurality of document images as a single image.

14. The method according to claim 13, wherein orientation is detected at said orientation step based upon characters in the document image.

15. The method according to claim 14, wherein orientation is detected by an optical character recognition unit at said orientation step.

16. The method according to claim 13, wherein a plurality of document images inclusive of a landscape-type document image and a portrait-type document image are arranged at said arranging step.

17. The method according to claim 16, wherein a plurality of document images are arranged at said arranging step upon making the orientations thereof the same.

18. The method according to claim 13, wherein a plurality of document images inclusive of document images of different sizes are arranged at said arranging step.

19. The method according to claim 13, wherein a plurality of document images are arranged at said arranging step.

20. The method according to claim 13, wherein a document page number is added onto the document image at said arranging step.

21. The method according to claim 13, wherein the document image is reduced at said arranging step at a magnification that is independent for each document.

22. The method according to claim 13, wherein the document image is input by a scanner at said input step.

23. The method according to claim 13, wherein images arranged at said arranging step are printed by a printer.

24. An image processing method comprising:

an input step of inputting a document image;

a detecting step of detecting orientation of the document image that has been input at said input step;

a step of arranging a plurality of document images as one image in dependence upon detection results obtained at said detecting step; and in response to presence of a document image whose orientation cannot be detected at said detecting step, a step of arranging this document image based upon an assumption that the orientation thereof is the same as the orientations of other document images arranged together with this document image.

25. A computer-readable storage medium storing instructions executable by a processor-controlled apparatus, said instructions comprising instructions for controlling the apparatus to:

input a document image;

detect an orientation of the input document image;

detect a size of the input document image;

reduce the input document image at a magnification that conforms to the orientation and size of the document image; and arrange a plurality of document images as a single image.

26. A computer-readable storage medium storing instructions executable by a processor-controlled apparatus, said instructions comprising instructions for controlling the apparatus to:

input a document image;

detect an orientation of the input document; and arrange a plurality of document images as one image in dependence upon the orientations of the document images;

wherein in response to presence of a document image whose orientation cannot be detected, said arranging instructions cause the apparatus to arrange this document image based upon an assumption that the orientation thereof is the same as the orientations of other document images arranged together with this document image.

27. An image processing apparatus comprising:

input means for inputting a document image;

detecting means for detecting orientation of the document image that has been input by said input means; and control means for controlling the orientation of the document image in dependence upon detection results obtained by said detecting means, wherein in response to presence of a document image whose orientation cannot be detected by said detecting means, said control means controls the orientation of this document image based upon an assumption that the orientation thereof is the same as the orientation of a first page of the document image.

28. The apparatus according to claim 27, wherein said control means arranges a plurality of input document images as one image in dependence upon detection results obtained by said detecting means.

29. The apparatus according to claim 27, wherein said detecting means detects the orientation based upon characters in the document image.

30. The apparatus according to claim 29, wherein said detecting means detects the orientation by using an optical character recognition unit.

31. An image processing apparatus comprising:

input means for inputting a document image;

detecting means for detecting orientation of the document image that has been input by said input means; and control means for controlling the orientation of the document image in dependence upon detection results obtained by said detecting means;

wherein in response to presence of a document image whose orientation cannot be detected by said detecting means, said control means controls the orientation of this document image based upon an assumption that the orientation thereof is the same as the orientation of a previously input document image.

32. The apparatus according to claim 31, wherein said control means arranges a plurality of document images as one image in dependence upon detection results obtained by said detecting means.

33. The apparatus according to claim 32, wherein said detecting means detects the orientation based upon characters in the document image.

34. The apparatus according to claim 33, wherein said detecting means detects the orientation by using an optical character recognition unit.

35. The apparatus according to claim 12, wherein said detecting means detects the orientation based upon characters in the document image.

36. The apparatus according to claim 35, wherein said detecting means detects the orientation by using an optical character recognition unit.

37. An image processing method comprising the steps of:

inputting a document image;

detecting orientation of the input document image; and controlling the orientation of the document image in dependence upon the detection results, wherein in the controlling step, in response to presence of a document image whose orientation cannot be detected in the detecting step, the orientation of this document image is controlled based upon an assumption that the orientation thereof is the same as the orientation of a first page of the document image.

38. The method according to claim 37, wherein in the controlling step, a plurality of document images are arranged as one image in dependence upon the detection results.

39. The method according to claim 37, wherein in the detecting step, the orientation is detected based upon characters in the document image.

40. The method according to claim 39, wherein in the detecting step, the orientation is detected by using an optical character recognition unit.

41. An image processing method comprising the steps of:

inputting a document image;

detecting orientation of the input document image; and controlling the orientation of the input document image in dependence upon the detection results, wherein in the controlling step, in response to presence of a document image whose orientation cannot be detected in the detecting step, the orientation of this document image is controlled based upon an assumption that the orientation thereof is the same as the orientation of a previously input document image.

42. The method according to claim 41, wherein in the controlling step, a plurality of document images are arranged as one image in dependence upon the detection results.

43. The method according to claim 41, wherein in the detecting step, the orientation is detected based upon characters in the document image.

44. The method according to claim 43, wherein in the detecting step, the orientation is detected by using an optical character recognition unit.

45. The method according to claim 24, wherein in the detecting step, the orientation is detected based upon characters in the document image.

46. The method according to claim 45, wherein in the detecting step, the orientation is detected by using an optical character recognition unit.

47. A computer program product comprising a computer readable medium having computer program code, for executing an image processing, said product comprising:

input process procedure code for inputting a document image;

detection process procedure code for detecting orientation of the input document image; and control process procedure code for controlling the orientation of the document image in dependence upon the detection results, wherein in the control process, in response to presence of a document image whose orientation cannot be detected in the detection process, the orientation of this document image is controlled based upon an assumption that the orientation thereof is the same as the orientation of a first page of the document image.

48. A computer program product comprising a computer readable medium having computer program code, for executing an image processing, said product comprising:

input process procedure code for inputting a document image;

detection process procedure code for detecting orientation of the input document image; and control process procedure code for controlling the orientation of the document image in dependence upon the detection results, wherein in the control process, in response to presence of a document image whose orientation cannot be detected in the detection process, the orientation of this document image is controlled based upon an assumption that the orientation thereof is the same as the orientation of a previously input document image.

* * * * *

UNITED STATES PATENT AND TRADEMARK OFFICE
CERTIFICATE OF CORRECTION

PATENT NO. : 6,041,205

DATED : March 21, 2000

INVENTOR(S) : MASAHIRO FUNADA ET AL.

It is certified that error appears in the above-identified patent and that said Letters Patent is hereby corrected as shown below:

SHEET 10

Figure 10A:
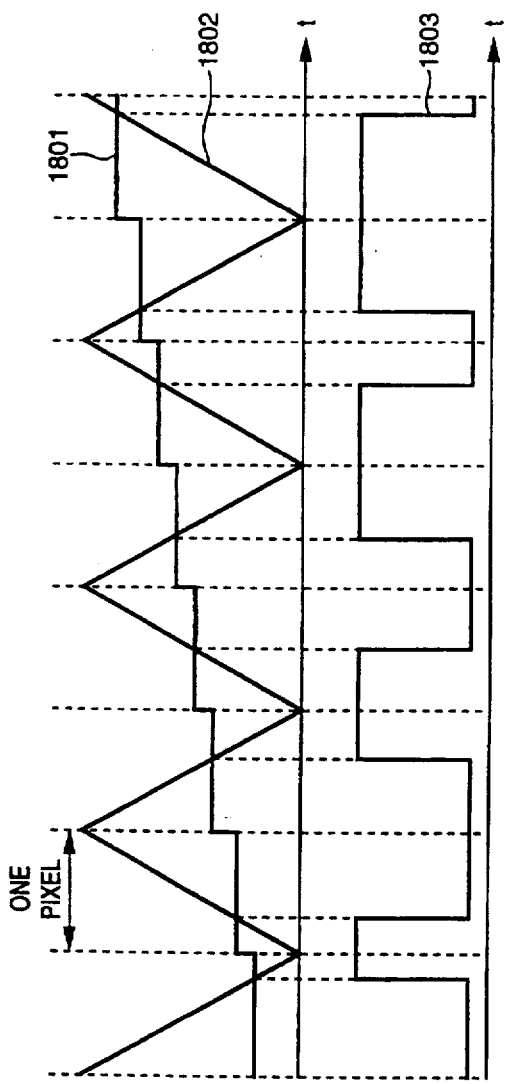
Figure 10B:
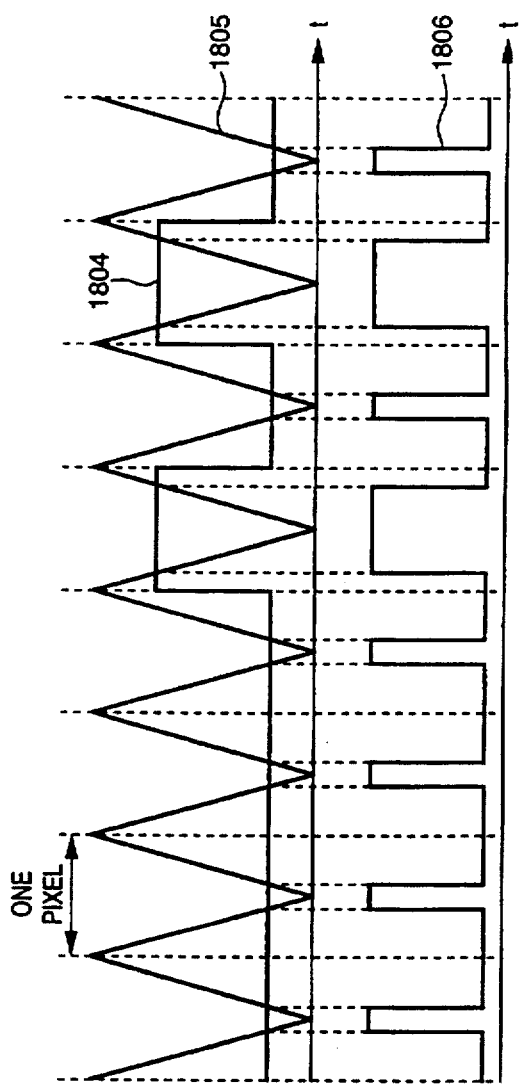

Figure 10, insert attached amended figures 10A and 10B.

COLUMN 1

Line 23, "images" should read --image--.

COLUMN 2

Line 27, "FIG. 10 shows an example of a timing chart" should read --FIGS. 10A and 10B show timing charts--.

COLUMN 5

Line 17, "
$$\begin{bmatrix} C \\ M \\ Y \\ K \end{bmatrix} = \begin{bmatrix} a11 & a21 & a31 & a41 \\ a12 & a22 & a32 & a42 \\ a12 & a23 & a33 & a43 \\ a14 & a24 & a34 & a44 \end{bmatrix} \begin{bmatrix} C1 \\ M1 \\ Y1 \\ K1 \end{bmatrix} \quad \ldots (3)"$$

should read $$\begin{bmatrix} C \\ M \\ Y \\ K \end{bmatrix} = \begin{bmatrix} a11 & a21 & a31 & a41 \\ a12 & a22 & a32 & a42 \\ a12 & a23 & a33 & a43 \\ a14 & a24 & a34 & a44 \end{bmatrix} \begin{bmatrix} C1 \\ M1 \\ Y1 \\ K1 \end{bmatrix} \quad \ldots (3)$$

$$K1 = \min(C1, M1, Y1) \quad \ldots (4)--$$

COLUMN 6

Line 40, "FIG. 4a" should read --FIG. 4 is a--.

UNITED STATES PATENT AND TRADEMARK OFFICE
CERTIFICATE OF CORRECTION

PATENT NO. : 6,041,205

DATED : March 21, 2000

INVENTOR(S) : MASAHIRO FUNADA ET AL.

It is certified that error appears in the above-identified patent and that said Letters Patent is hereby corrected as shown below:

COLUMN 9

Line 13, "The top half of FIG. 10" should read --FIG. 10A--;
Line 18, "The bottom half of FIG. 10" should read --FIG. 10B--.

COLUMN 10

Line 44, "that" should be deleted.

COLUMN 15

Line 59, "of each memory" (first occurrence) should be deleted.

COLUMN 16

Line 11, "image" should read --images--.

COLUMN 17

Line 5, "means;" should read --means,--.

UNITED STATES PATENT AND TRADEMARK OFFICE
CERTIFICATE OF CORRECTION

PATENT NO.   :   6,041,205

DATED        :   March 21, 2000

INVENTOR(S)  :   MASAHIRO FUNADA ET AL.

It is certified that error appears in the above-identified patent and that said Letters Patent is hereby corrected as shown below:

<u>COLUMN 18</u>

Line 16, "images;" should read --images,--;
　　Line 54, "means;" should read --means,--.

Signed and Sealed this

Eighth Day of May, 2001

*Attest:*

NICHOLAS P. GODICI

*Attesting Officer*　　　*Acting Director of the United States Patent and Trademark Office*